(12) United States Patent
Yoon et al.

(10) Patent No.: US 12,162,504 B2
(45) Date of Patent: Dec. 10, 2024

(54) DEVICE PROVIDED TO VEHICLE AND CONTROL METHOD THEREFOR

(71) Applicant: LG ELECTRONICS INC., Seoul (KR)

(72) Inventors: Jaegu Yoon, Seoul (KR); Junbum Park, Seoul (KR); Namsu Lee, Seoul (KR); Hyoungkyu Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 744 days.

(21) Appl. No.: 17/296,084

(22) PCT Filed: Nov. 21, 2018

(86) PCT No.: PCT/KR2018/014348
§ 371 (c)(1),
(2) Date: May 21, 2021

(87) PCT Pub. No.: WO2020/105749
PCT Pub. Date: May 28, 2020

(65) Prior Publication Data
US 2022/0009513 A1    Jan. 13, 2022

(51) Int. Cl.
B60W 50/10        (2012.01)
B60K 35/00        (2006.01)
G06F 9/4401       (2018.01)

(52) U.S. Cl.
CPC ............. *B60W 50/10* (2013.01); *B60K 35/00* (2013.01); *G06F 9/4401* (2013.01)

(58) Field of Classification Search
CPC .......... B60W 50/10; B60W 2050/146; B60W 50/14; B60K 35/00; B60K 35/22;
(Continued)

(56) References Cited

U.S. PATENT DOCUMENTS

2003/0120852 A1    6/2003  McConnell et al.
2003/0154112 A1    8/2003  Neiman et al.
(Continued)

FOREIGN PATENT DOCUMENTS

CN    105229714    1/2016
CN    107402686    11/2017
(Continued)

OTHER PUBLICATIONS

Extended European Search Report in European Appln. No. 18940791.9, dated Jun. 7, 2022, 7 pages.
(Continued)

*Primary Examiner* — Sizo B Vilakazi
(74) *Attorney, Agent, or Firm* — Fish & Richardson P.C.

(57) ABSTRACT

Proposed are a device provided to a vehicle and a control method therefor. Specifically, proposed is a device provided to a vehicle, the device comprising: a plurality of system on chips (SoCs) which execute at least one application and are connected via a predetermined input/output interface; and a display which is provided in the vehicle and outputs an execution screen of the at least one application. Further, proposed is that a first SoC, among the plurality of SoCs, requests the execution of a specific application, among the at least one application, to a second SoC on the basis of the resource state of the first SoC, and as a response to the request, receives the execution result of the specific application from the second SoC.

14 Claims, 19 Drawing Sheets

(58) Field of Classification Search
CPC .......... B60K 2360/11; B60K 2360/111; B60K 35/10; G06F 9/4401; G06F 2209/503; G06F 2209/509; G06F 9/5033
See application file for complete search history.

(56) References Cited

U.S. PATENT DOCUMENTS

| | | | |
|---|---|---|---|
| 2007/0139898 A1 | 6/2007 | Yang | |
| 2014/0380403 A1 | 12/2014 | Pearson et al. | |
| 2017/0004063 A1 | 1/2017 | Broderick et al. | |
| 2017/0080922 A1* | 3/2017 | Eo | B60W 30/18 |
| 2017/0308408 A1* | 10/2017 | Goyal | G06F 9/45533 |
| 2018/0129901 A1 | 5/2018 | Jo et al. | |
| 2019/0308630 A1* | 10/2019 | K | B60W 10/06 |

FOREIGN PATENT DOCUMENTS

| | | | |
|---|---|---|---|
| CN | 107436808 | 12/2017 | |
| JP | 2001-22597 | 1/2001 | |
| KR | 100662471 | 1/2007 | |
| KR | 100662471 B1 * | 1/2007 | ......... G06F 13/4022 |
| KR | 1020080047792 | 5/2008 | |
| KR | 1020110031715 | 3/2011 | |
| KR | 1020170121056 | 11/2017 | |

OTHER PUBLICATIONS

PCT International Search Report and Written Opinion in International Appln. No. PCT/KR2018/014348, dated Aug. 7, 2019, 20 pages (with English translation).

Office Action in Chinese Appln. No. 201880099697.9, dated Mar. 16, 2023, 25 pages (with English translation).

Li, "Algorithm research of Software/Hardware Codesign Optimization on Reconfigurable MPSoc," dissertation for doctor's degree, University of Science and Technology of China, Oct. 1, 2013, 130 pages (with English abstract).

Notice of Allowance in Chinese Appln. No. 2018800996979, mailed on Sep. 26, 2023, 8 pages (with English translation).

* cited by examiner

FIG. 1
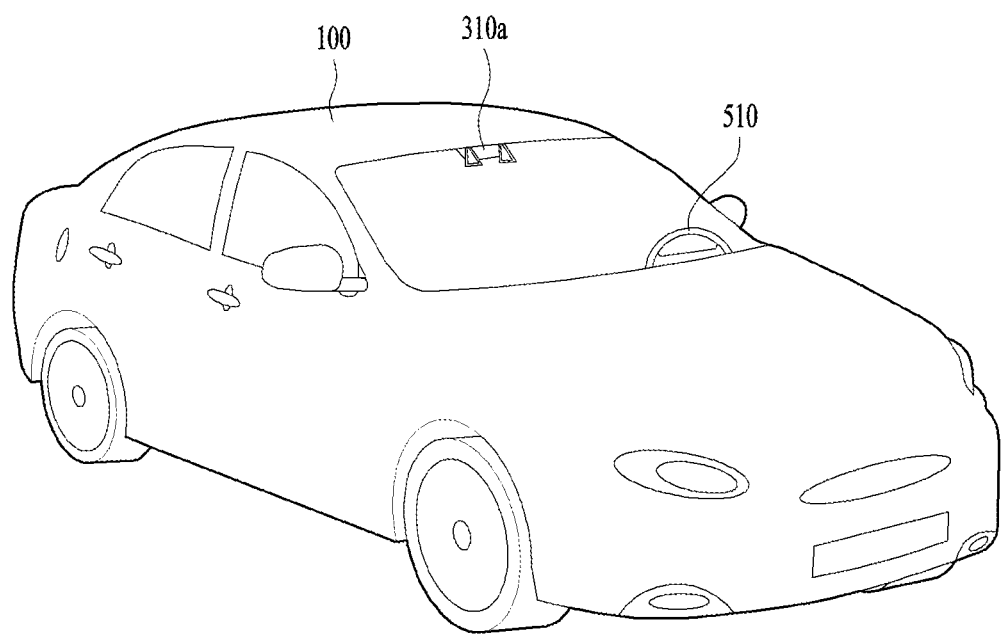
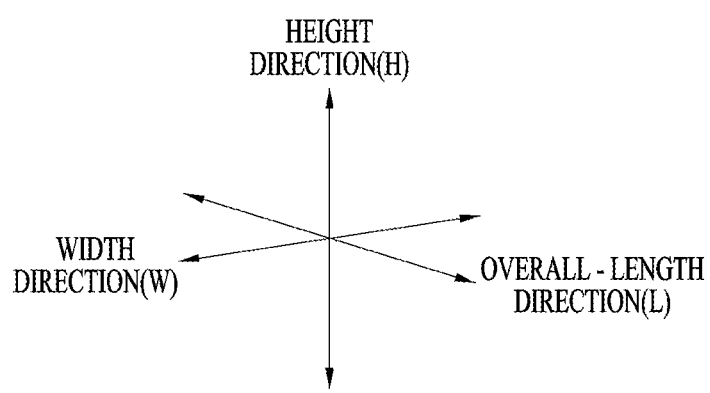

FIG. 18

| Required Resource & Threshold for decision |||||||||
|---|---|---|---|---|---|---|---|---|
| App list || CPU(%) | Mem.(%) | GPU(%) | DSP(%) | Launch | Priority | Running |
| Apps | App 1 |  |  |  |  | Base | 1 | Node1 |
|  | App 2 |  |  |  |  | Base | 1 | Node1 |
|  | App 3 |  |  |  |  | Local | 3 | Node1 |
|  | App 4 |  |  |  |  | Global | 5 | Node2 |

(a)

| App list | CPU(%) | Usage_Moment(%) | Free_Moment(%) | Usage_Average(%) | Free_Average(%) |
|---|---|---|---|---|---|
| Node1 | CPU |  |  |  |  |
| Node1 | Memory |  |  |  |  |
| Node1 | GPU |  |  |  |  |
| Node1 | DSP |  |  |  |  |
| Node2 | CPU |  |  |  |  |
| Node2 | Memory |  |  |  |  |
| Node2 | GPU |  |  |  |  |
| Node2 | DSP |  |  |  |  |

(b)

DEVICE PROVIDED TO VEHICLE AND CONTROL METHOD THEREFOR

CROSS-REFERENCE TO RELATED APPLICATIONS

This application is a National Stage application under 35 U.S.C. § 371 of International Application No. PCT/KR2018/014348, filed on Nov. 21, 2018, the contents of which are hereby incorporated by reference in its entirety.

TECHNICAL FIELD

The present disclosure relates to a device disposed in a vehicle and a method for controlling the same. More specifically, the present disclosure relates to a method for distributing workloads between a plurality of system on chips (SoCs) that control a display disposed in a vehicle.

BACKGROUND ART

A vehicle traditionally functions as means of transportation for a user, but is equipped with various sensors, electronic devices, and the like for a convenience of the user to provide a driving convenience of the user. In particular, a development of an advanced driver assistance system (ADAS) for the driving convenience of the user, and by extension, of an autonomous vehicle is being actively conducted.

Recent advanced driver assistance system and autonomous vehicle provide various display devices for a convenience of a passenger as well as the driving convenience of the user. These are also known as in-car entertainment (ICE) or in-vehicle infotainment (IVI). The ICE or the IVI may be referred to as vehicle hardware and software that provide audio or video entertainment. In particular, the IVI includes a vehicle navigation system, a video player, USB and Bluetooth connections, a carputer, an in-vehicle Internet, and a WiFi.

As such, as a display that supports high resolution is added to an in-vehicle infotainment domain, requirements for performances of the display and a domain control system that controls the display are increasing. However, a domain control system of the prior art has problems that a HW headroom for adding an ECU that supports a new function is insufficient, and a high performance requirement, especially, a large number of displays are not be able to be controlled by a single ECU.

DISCLOSURE

Technical Problem

In order to solve the above-described problems, a technical task to be achieved in the present disclosure is to provide a display disposed in a vehicle and a workload distribution method between a plurality of system on chips (SoCs) that control the display.

The technical task to be achieved in the present disclosure is to solve such problems of the prior art. The technical tasks to be achieved in the present disclosure are not limited to the above-described technical task. Other technical issues not mentioned may be clearly understood by those of ordinary skill in the technical field to which the present disclosure belongs from the following description.

Technical Solutions

In one aspect of the present disclosure for achieving the above-described technical problem, provided is a device disposed in a vehicle, including a plurality of system on chips (SoCs) that launches at least one application, wherein the plurality of SoCs are connected to each other through a predetermined input/output interface, and a display disposed in the vehicle, wherein the display outputs a launch screen of the at least one application. In particular, a first SoC of the plurality of SoCs may request a second SoC to launch a specific application of the at least one application based on a resource state of the first SoC, and receive a launch result of the specific application from the second SoC in response to the request.

The first SoC may request the second SoC to launch the specific application when the resource state of the first SoC is a resource full state, and a resource state of the second SoC is not the resource full state.

The first SoC may terminate one of the at least one application based on a predetermined priority when resource states of the first SoC and the second SoC are both a resource full state.

The at least one application may be one of a base application launched during boot-up of the device disposed in the vehicle and a normal application launched by a user request.

The first SoC may transmit a touch input of a user related to the specific application to the second SoC as the launch result of the specific application is received from the second SoC.

The display may include at least one of a head up display (HUD), a cluster, a head unit, a rear seat entertainment (RSE), a co-driver display, and/or an E-Mirror.

The predetermined input/output interface may be a peripheral component interconnect express (PCIe).

Advantageous Effects

In an aspect of the present disclosure, the problems of the prior art described above, that is, the problems that the HW headroom for adding the ECU that supports the new function is insufficient, and the high performance requirement, especially, the large number of displays are not be able to be controlled by the single ECU may be solved. Specifically, the device disposed in the vehicle according to an aspect of the present disclosure is advantageous in terms of hardware upgrade and replacement, and is advantageous in terms of workload distribution between a plurality of SoCs that use resources.

Effects that may be obtained from the present disclosure are not limited to the effects mentioned above. Other effects not mentioned may be clearly understood by those of ordinary skill in the technical field to which the present disclosure belongs from the following description.

DESCRIPTION OF DRAWINGS

The accompanying drawings, which are included as part of the detailed description to help understand the present disclosure, provide embodiments of the present disclosure and describe the technical idea of the present disclosure together with the detailed description.

FIG. 1 is a diagram showing an exterior of a vehicle according to an embodiment of the present invention.

FIG. 18 is a diagram for illustrating a resource table in a workload distribution scenario between SoCs according to an aspect of the present disclosure.

BEST MODE

Figure 2:
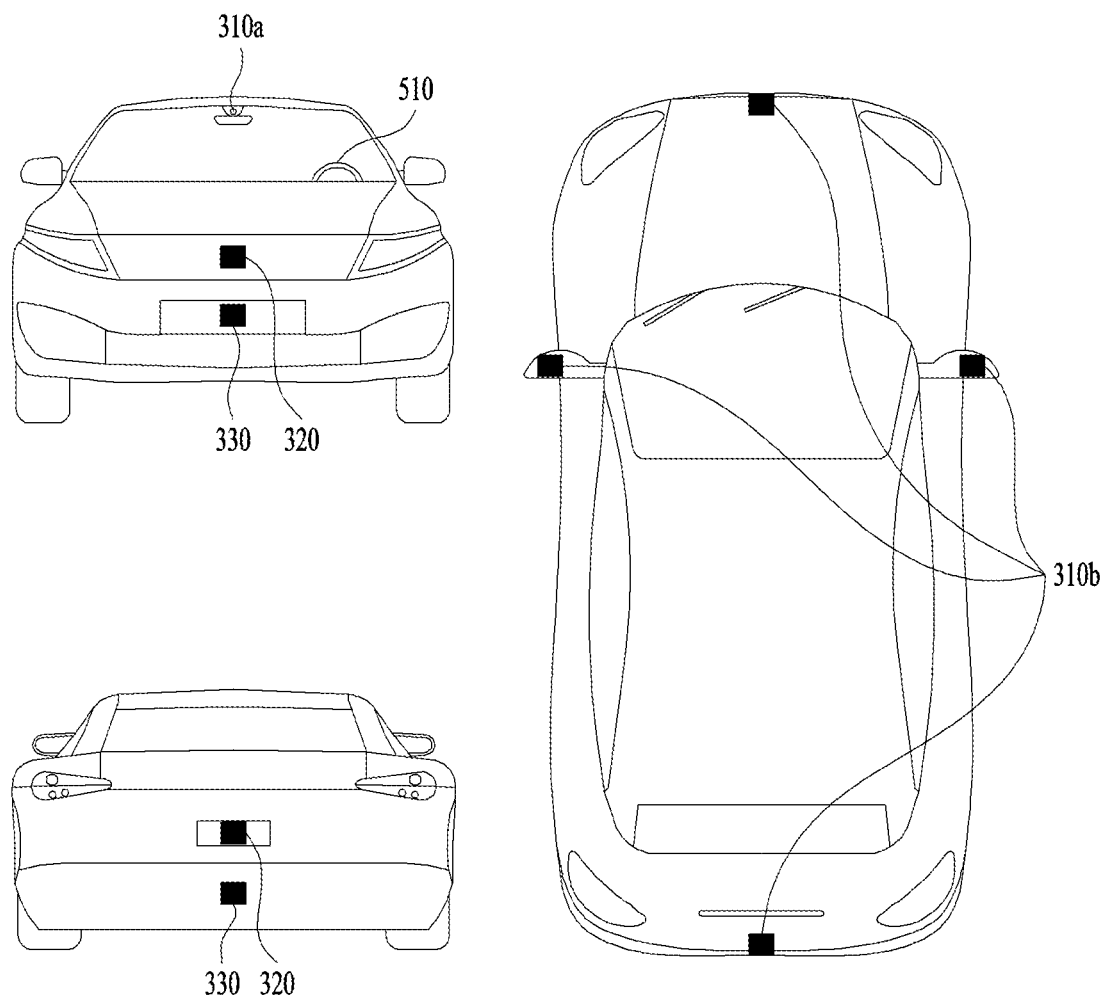
FIG. 2 is a diagram showing a vehicle externally viewed in various angles according to an embodiment of the present invention.

Hereinafter, the embodiments disclosed in the present specification will be described in detail with reference to the accompanying drawings, and the same or similar elements are denoted by the same reference numerals even though they are depicted in different drawings and redundant descriptions thereof will be omitted. In the following description, with respect to constituent elements used in the following description, the suffixes "module" and "unit" are used or combined with each other only in consideration of ease in the preparation of the specification, and do not have or serve as different meanings. Accordingly, the suffixes "module" and "unit" may be interchanged with each other. In addition, in the following description of the embodiments disclosed in the present specification, a detailed description of known functions and configurations incorporated herein will be omitted when it may make the subject matter of the embodiments disclosed in the present specification rather unclear. In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents and substitutions included in the scope and sprit of the present invention.

It will be understood that although the terms "first," "second," etc., may be used herein to describe various components, these components should not be limited by these terms. These terms are only used to distinguish one component from another component.

It will be understood that when a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless the context clearly indicates otherwise. In the present application, it will be further understood that the terms "comprises", includes," etc. specify the presence of stated features, integers, steps, operations, elements, components, or combinations thereof, but do not preclude the presence or addition of one or more other features, integers, steps, operations, elements, components, or combinations thereof.

A vehicle as described in this specification may include an automobile and a motorcycle. Hereinafter, a description will be given based on an automobile. A vehicle as described in this specification may include all of an internal combustion engine vehicle including an engine as a power source, a hybrid vehicle including both an engine and an electric motor as a power source, and an electric vehicle including an electric motor as a power source. In the following description, "the left side of the vehicle" refers to the left side in the forward driving direction of the vehicle, and "the right side of the vehicle" refers to the right side in the forward driving direction of the vehicle.

FIG. 1 is a view of the external appearance of a vehicle according to an embodiment of the present disclosure.

FIG. 2 is different angled views of a vehicle according to an embodiment of the present disclosure.

Figure 3:
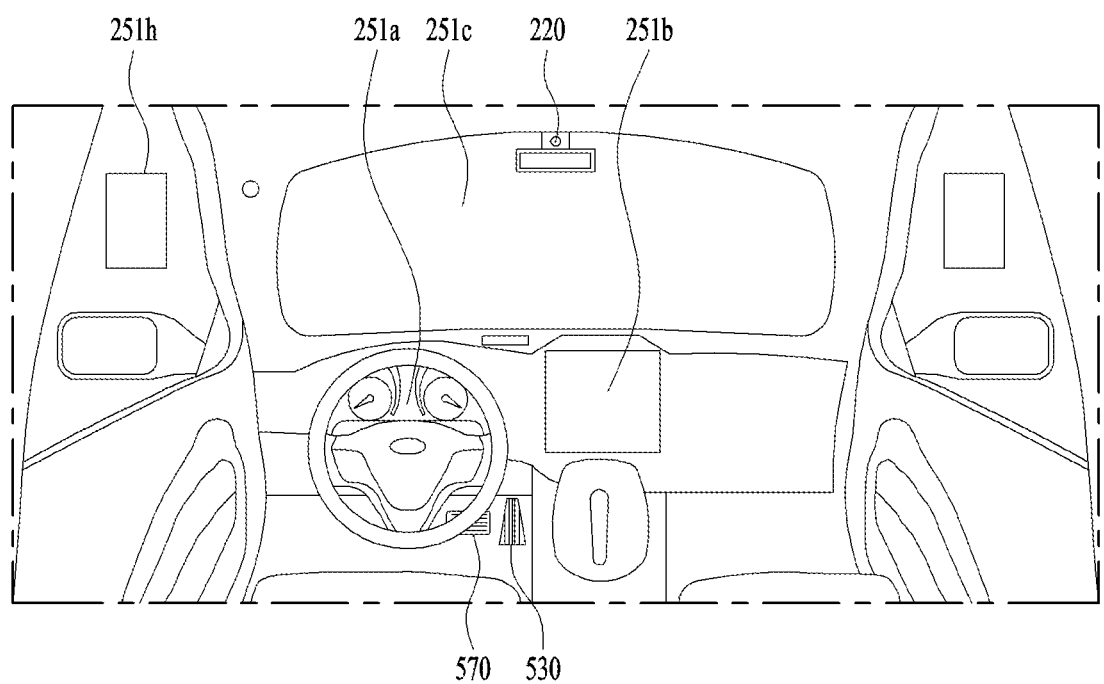
FIG. 3 and FIG. 4 are diagrams showing an interior of a vehicle according to an embodiment of the present invention.
Figure 4:
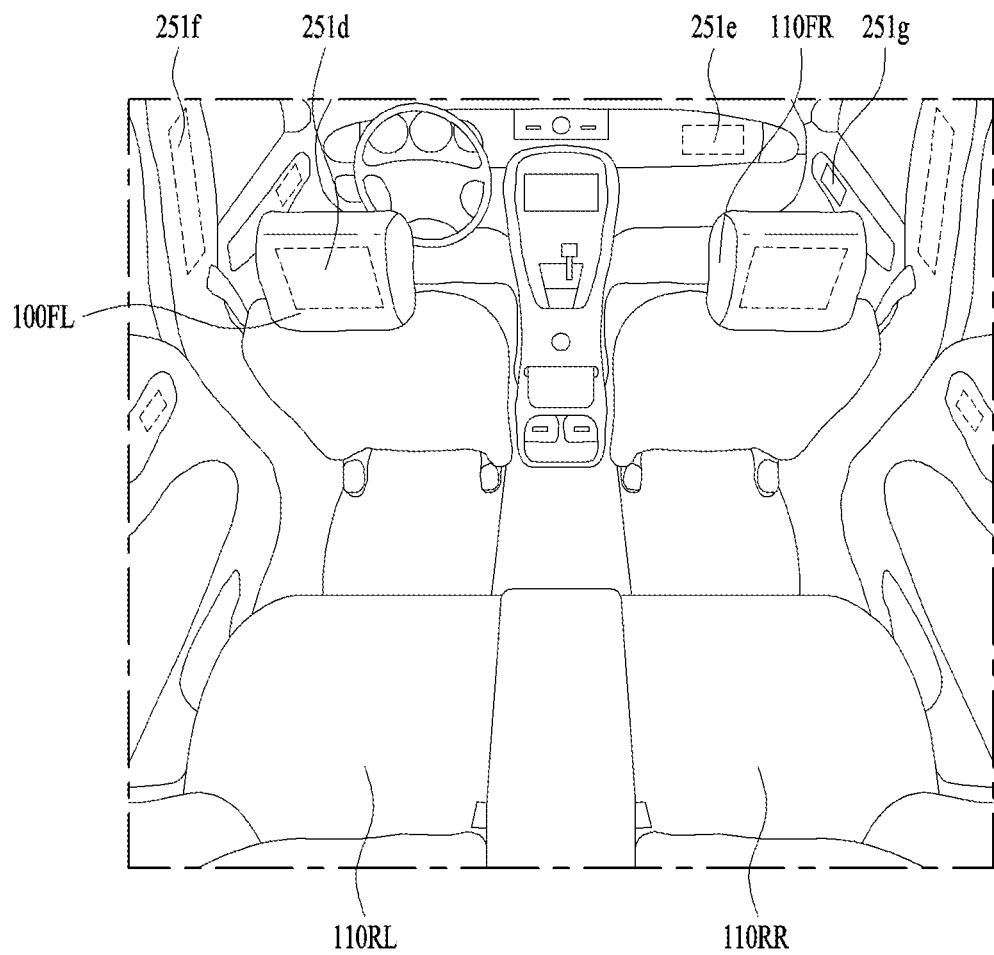

FIGS. 3 and 4 are views of the internal configuration of a vehicle according to an embodiment of the present disclosure.

Figure 5:
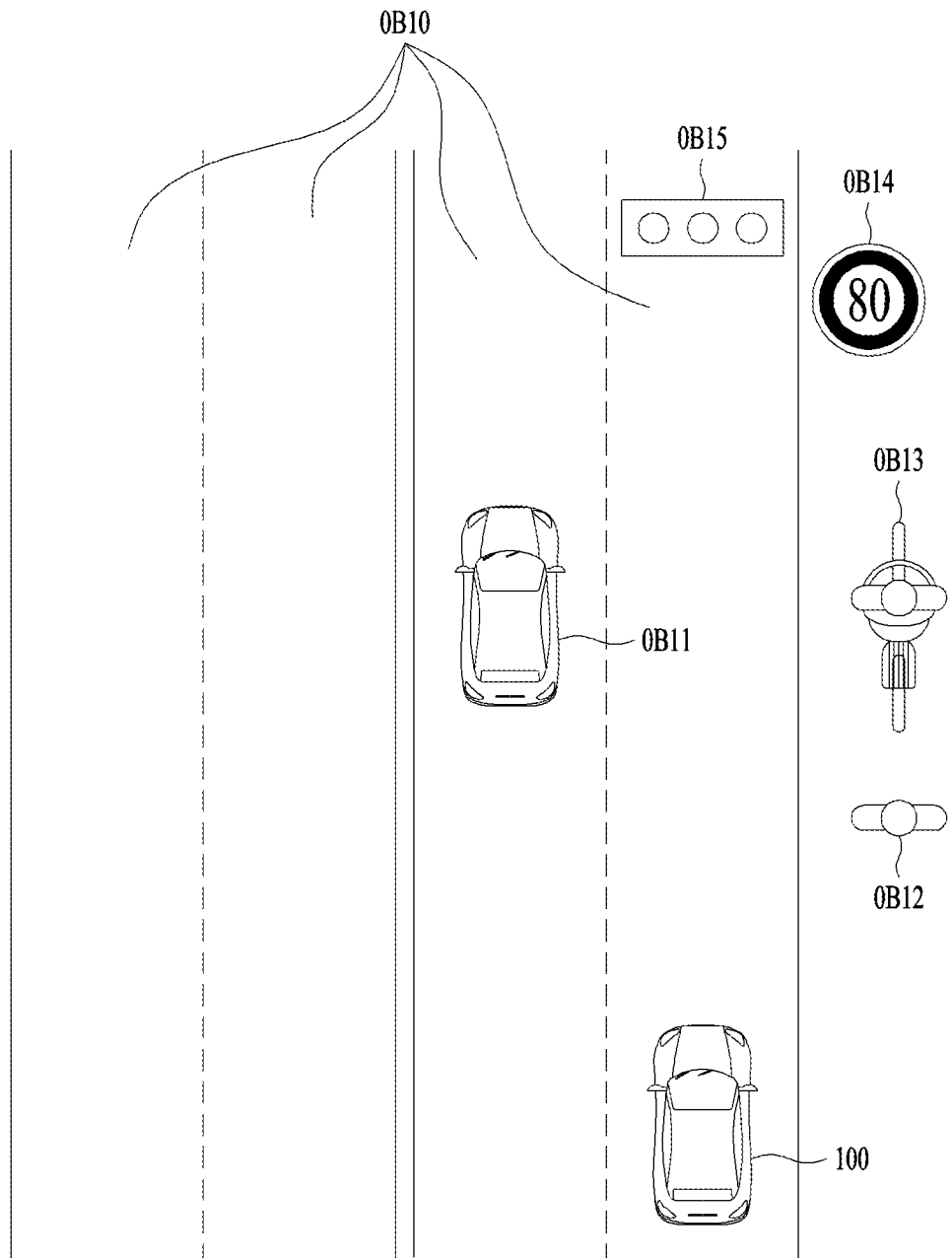
FIG. 5 and FIG. 6 are diagrams referred to for description of an object according to an embodiment of the present invention.
Figure 6:
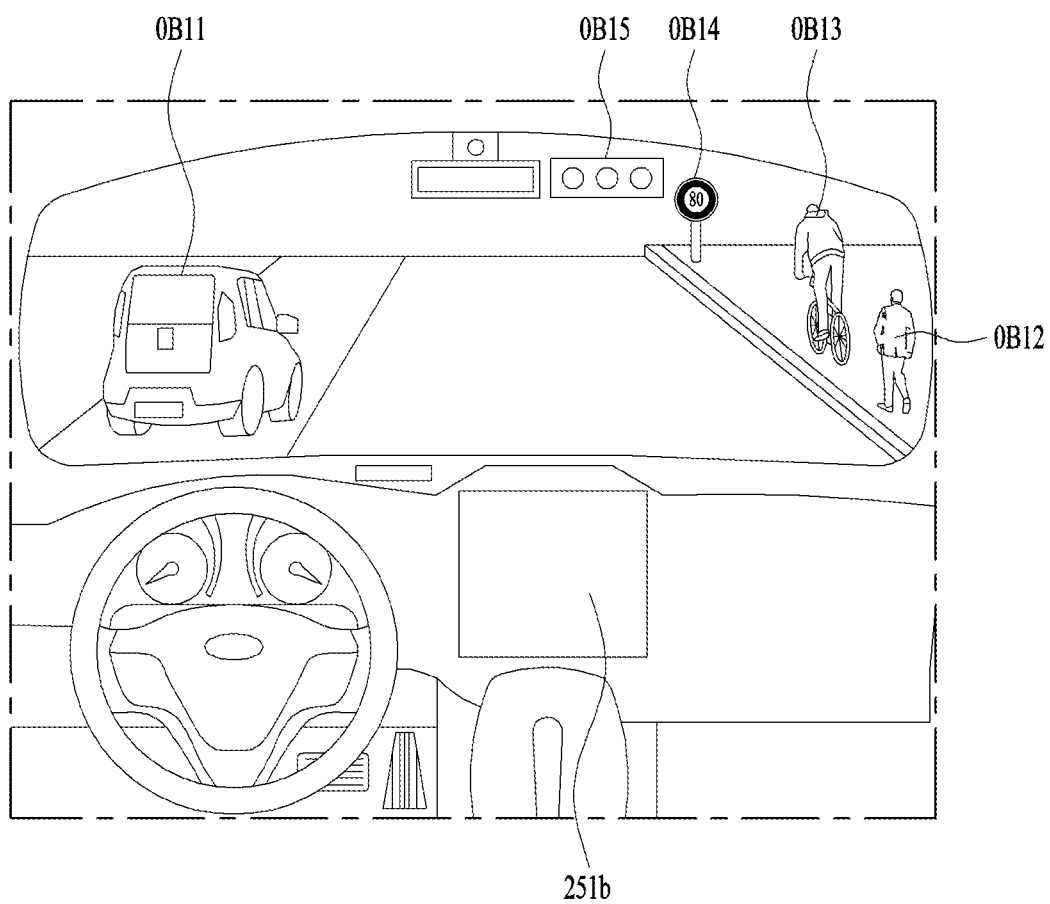

FIGS. 5 and 6 are views for explanation of objects according to an embodiment of the present disclosure.

Figure 7:
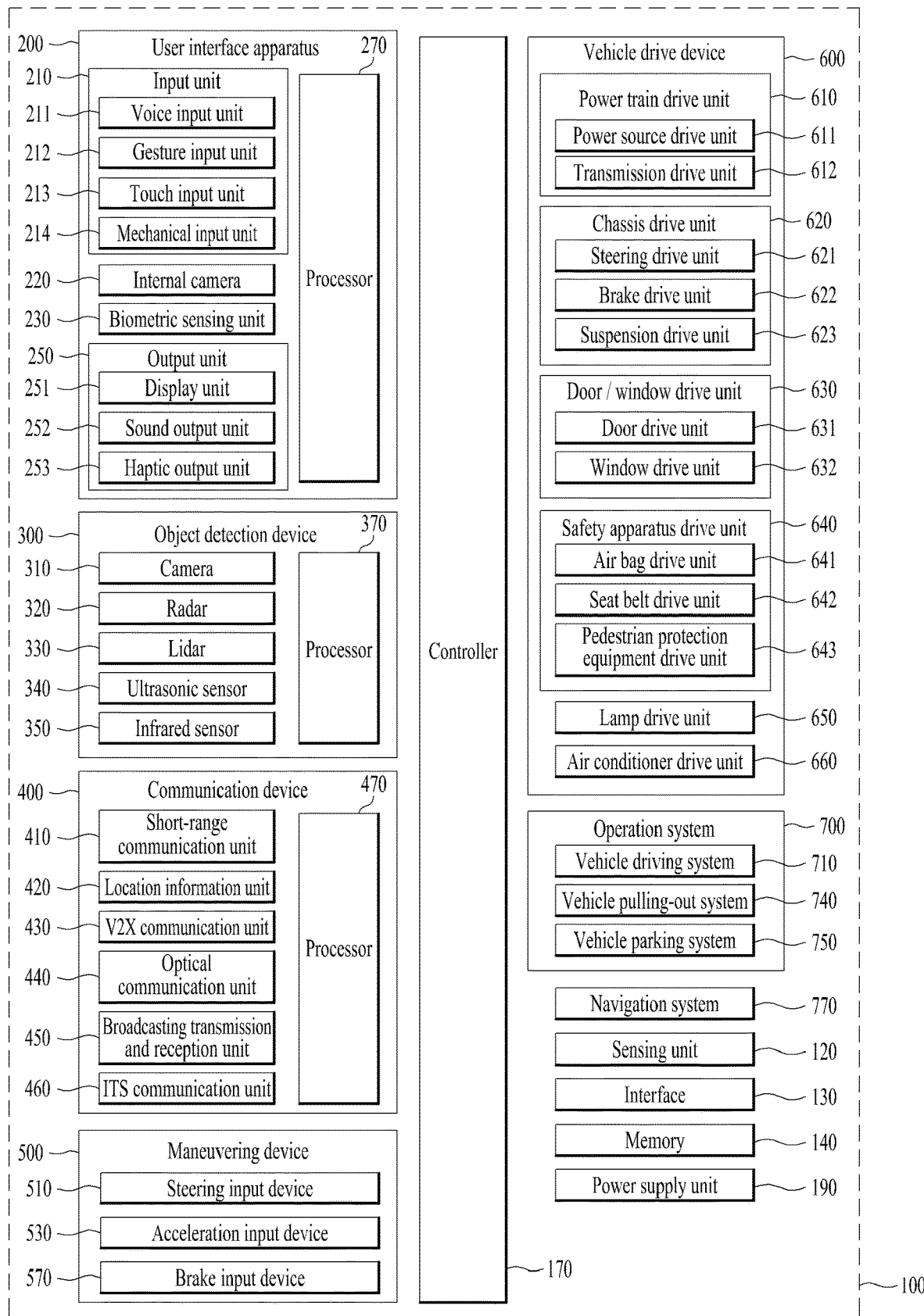
FIG. 7 is a block diagram referred to for description of a vehicle according to an embodiment of the present invention.

FIG. 7 is a block diagram illustrating a vehicle according to an embodiment of the present disclosure.

Referring to FIGS. 1 to 7, a vehicle 100 may include a plurality of wheels, which are rotated by a power source, and a steering input device 510 for controlling a driving direction of the vehicle 100.

The vehicle 100 may be an autonomous vehicle. The vehicle 100 may be switched to an autonomous mode or a manual mode in response to a user input. For example, in response to a user input received through a user interface apparatus 200, the vehicle 100 may be switched from a manual mode to an autonomous mode, or vice versa.

The vehicle 100 may be switched to the autonomous mode or to the manual mode based on driving environment information. The driving environment information may include at least one of the following: information on an object outside a vehicle, navigation information, and vehicle state information.

The vehicle 100 may be switched from the manual mode to the autonomous mode, or vice versa, based on information, data, and a signal provided from an external device.

When the vehicle 100 operates in the autonomous mode, the autonomous vehicle 100 may operate based on an operation system 700. For example, the autonomous vehicle 100 may operate based on information, data, or signals generated by a driving system 710, a vehicle pulling-out system 740, and a vehicle parking system 750.

While operating in the manual mode, the autonomous vehicle 100 may receive a user input for driving of the vehicle 100 through a maneuvering device 500. In response to the user input received through the maneuvering device 500, the vehicle 100 may operate.

The term "overall length" means the length from the front end to the rear end of the vehicle 100, the term "overall width" means the width of the vehicle 100, and the term "overall height" means the height from the bottom of the wheel to the roof. In the following description, the term "overall length direction L" may mean the reference direction for the measurement of the overall length of the vehicle 100, the term "overall width direction W" may mean the reference direction for the measurement of the overall width of the vehicle 100, and the term "overall height direction H" may mean the reference direction for the measurement of the overall height of the vehicle 100.

As illustrated in FIG. 7, the vehicle 100 may include the user interface device 200, the object detection device 300, the communication device 400, the maneuvering device 500, a vehicle drive device 600, the operation system 700, a navigation system 770, a sensing unit 120, an interface 130, a memory 140, a controller 170, and a power supply unit 190.

In some embodiments, the vehicle 100 may further include other components in addition to the aforementioned components, or may not include some of the aforementioned components. The sensing unit 120 may sense the state of the vehicle. The sensing unit 120 may include an attitude sensor (for example, a yaw sensor, a roll sensor, or a pitch sensor), a collision sensor, a wheel sensor, a speed sensor, a gradient sensor, a weight sensor, a heading sensor, a gyro sensor, a position module, a vehicle forward/reverse movement sensor, a battery sensor, a fuel sensor, a tire sensor, a steering sensor based on the rotation of the steering wheel, an in-vehicle temperature sensor, an in-vehicle humidity sensor, an ultrasonic sensor, an illumination sensor, an accelerator pedal position sensor, and a brake pedal position sensor.

The sensing unit 120 may acquire sensing signals with regard to, for example, vehicle attitude information, vehicle collision information, vehicle driving direction information, vehicle location information (GPS information), vehicle angle information, vehicle speed information, vehicle acceleration information, vehicle tilt information, vehicle forward/reverse movement information, battery information, fuel information, tire information, vehicle lamp information, in-vehicle temperature information, in-vehicle humidity information, steering-wheel rotation angle information, outside illumination information, information about the pressure applied to an accelerator pedal, and information about the pressure applied to a brake pedal.

The sensing unit 120 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 120 may generate vehicle state information based on sensing data. The vehicle condition information may be information that is generated based on data sensed by a variety of sensors inside a vehicle.

For example, the vehicle state information may include vehicle position information, vehicle speed information, vehicle tilt information, vehicle weight information, vehicle direction information, vehicle battery information, vehicle fuel information, vehicle tire pressure information, vehicle steering information, in-vehicle temperature information, in-vehicle humidity information, pedal position information, vehicle engine temperature information, etc.

The interface 130 may serve as a passage for various kinds of external devices that are connected to the vehicle 100. For example, the interface 130 may have a port that is connectable to a mobile terminal and may be connected to the mobile terminal via the port. In this case, the interface 130 may exchange data with the mobile terminal.

Meanwhile, the interface 130 may serve as a passage for the supply of electrical energy to a mobile terminal connected thereto. When the mobile terminal is electrically connected to the interface 130, the interface 130 may provide electrical energy, supplied from the power supply unit 190, to the mobile terminal under control of the controller 170.

The memory 140 is electrically connected to the controller 170. The memory 140 may store basic data for each unit, control data for the operational control of each unit, and input/output data. The memory 140 may be any of various hardware storage devices, such as a ROM, a RAM, an EPROM, a flash drive, and a hard drive. The memory 140 may store various data for the overall operation of the vehicle 100, such as programs for the processing or control of the controller 170. In some embodiments, the memory 140 may be integrally formed with the controller 170, or may be provided as an element of the controller 170.

The controller 170 may control the overall operation of each unit inside the vehicle 100. The controller 170 may be referred to as an Electronic Controller (ECU). The power supply unit 190 may supply power required to operate each component under control of the controller 170. In particular, the power supply unit 190 may receive power from, for example, a battery inside the vehicle 100.

At least one processor and the controller 170 included in the vehicle 100 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

Moreover, the sensing unit 120, the interface unit 130, the memory 140, the power supply unit 190, the user interface device 200, the object detection device 300, the communication device 400, the maneuvering device 500, the vehicle drive device 600, the operation system 700 and the navigation system 770 may have individual processors or be integrated into the controller 170.

The user interface device 200 is provided to support communication between the vehicle 100 and a user. The user interface device 200 may receive a user input, and provide information generated in the vehicle 100 to the user. The vehicle 100 may enable User Interfaces (UI) or User Experience (UX) through the user interface device 200.

The user interface device 200 may include an input unit 210, an internal camera 220, a biometric sensing unit 230, an output unit 250, and a processor 270. Each component of the user interface device 200 may be separated from or integrated with the afore-described interface 130, structurally or operatively.

In some embodiments, the user interface device 200 may further include other components in addition to the aforementioned components, or may not include some of the aforementioned components.

The input unit 210 is configured to receive information from a user, and data collected in the input unit 210 may be analyzed by the processor 270 and then processed into a control command of the user.

The input unit 210 may be disposed inside the vehicle 100. For example, the input unit 210 may be disposed in a region of a steering wheel, a region of an instrument panel, a region of a seat, a region of each pillar, a region of a door, a region of a center console, a region of a head lining, a region of a sun visor, a region of a windshield, or a region of a window.

The input unit 210 may include a voice input unit 211, a gesture input unit 212, a touch input unit 213, and a mechanical input unit 214.

The voice input unit 211 may convert a voice input of a user into an electrical signal. The converted electrical signal may be provided to the processor 270 or the controller 170. The voice input unit 211 may include one or more microphones.

The gesture input unit 212 may convert a gesture input of a user into an electrical signal. The converted electrical signal may be provided to the processor 270 or the controller 170. The gesture input unit 212 may include at least one selected from among an infrared sensor and an image sensor for sensing a gesture input of a user.

In some embodiments, the gesture input unit 212 may sense a three-dimensional (3D) gesture input of a user. To this end, the gesture input unit 212 may include a plurality of light emitting units for outputting infrared light, or a plurality of image sensors. The gesture input unit 212 may sense the 3D gesture input by employing a Time of Flight (TOF) scheme, a structured light scheme, or a disparity scheme.

The touch input unit 213 may convert a user's touch input into an electrical signal. The converted electrical signal may be provided to the processor 270 or the controller 170. The touch input unit 213 may include a touch sensor for sensing a touch input of a user. In some embodiments, the touch input unit 210 may be formed integral with a display unit 251 to implement a touch screen. The touch screen may provide an input interface and an output interface between the vehicle 100 and the user.

The mechanical input unit 214 may include at least one selected from among a button, a dome switch, a jog wheel, and a jog switch. An electrical signal generated by the mechanical input unit 214 may be provided to the processor 270 or the controller 170. The mechanical input unit 214 may be located on a steering wheel, a center fascia, a center console, a cockpit module, a door, etc.

The processor 270 may start a learning mode of the vehicle 100 in response to a user input to at least one of the afore-described voice input unit 211, gesture input unit 212, touch input unit 213, or mechanical input unit 214. In the learning mode, the vehicle 100 may learn a driving route and ambient environment of the vehicle 100. The learning mode will be described later in detail in relation to the object detection device 300 and the operation system 700.

The internal camera 220 may acquire images of the inside of the vehicle 100. The processor 270 may sense a user's condition based on the images of the inside of the vehicle 100. The processor 270 may acquire information on an eye gaze of the user. The processor 270 may sense a gesture of the user from the images of the inside of the vehicle 100.

The biometric sensing unit 230 may acquire biometric information of the user. The biometric sensing unit 230 may include a sensor for acquire biometric information of the user, and may utilize the sensor to acquire finger print information, heart rate information, etc. of the user. The biometric information may be used for user authentication.

The output unit 250 is configured to generate a visual, audio, or tactile output. The output unit 250 may include at least one selected from among a display unit 251, a sound output unit 252, and a haptic output unit 253.

The display unit 251 may display graphic objects corresponding to various types of information. The display unit 251 may include at least one selected from among a Liquid Crystal Display (LCD), a Thin Film Transistor-Liquid Crystal Display (TFT LCD), an Organic Light-Emitting Diode (OLED), a flexible display, a 3D display, and an e-ink display.

The display unit 251 may form an inter-layer structure together with the touch input unit 213, or may be integrally formed with the touch input unit 213 to implement a touch screen. The display unit 251 may be implemented as a Head Up Display (HUD). When implemented as a HUD, the display unit 251 may include a projector module in order to output information through an image projected on a windshield or a window. The display unit 251 may include a transparent display. The transparent display may be attached on the windshield or the window.

The transparent display may display a predetermined screen with a predetermined transparency. In order to achieve the transparency, the transparent display may include at least one selected from among a transparent Thin Film Electroluminescent (TFEL) display, an Organic Light Emitting Diode (OLED) display, a transparent Liquid Crystal Display (LCD), a transmissive transparent display, and a transparent Light Emitting Diode (LED) display. The transparency of the transparent display may be adjustable.

Meanwhile, the user interface device 200 may include a plurality of display units 251a to 251g.

The display unit 251 may be disposed in a region of a steering wheel, a region 251a, 251b or 251e of an instrument panel, a region 251d of a seat, a region 251f of each pillar, a region 251g of a door, a region of a center console, a region of a head lining, a region of a sun visor, a region 251c of a windshield, or a region 251h of a window.

The sound output unit 252 converts an electrical signal from the processor 270 or the controller 170 into an audio signal, and outputs the audio signal. To this end, the sound output unit 252 may include one or more speakers.

The haptic output unit 253 generates a tactile output. For example, the haptic output unit 253 may operate to vibrate a steering wheel, a safety belt, and seats 110FL, 110FR, 110RL, and 110RR so as to allow a user to recognize the output.

The processor 270 may control the overall operation of each unit of the user interface device 200. In some embodiments, the user interface device 200 may include a plurality of processors 270 or may not include the processor 270.

In a case where the user interface device 200 does not include the processor 270, the user interface device 200 may operate under control of the controller 170 or a processor of a different device inside the vehicle 100. Meanwhile, the user interface device 200 may be referred to as a display device for vehicle. The user interface device 200 may operate under control of the controller 170.

The object detection device 300 is used to detect an object outside the vehicle 100. The object detection device 300 may generate object information based on sensing data.

The object information may include information about the presence of an object, location information of the object, information on distance between the vehicle and the object, and the speed of the object relative to the vehicle 100. The object may include various objects related to travelling of the vehicle 100.

Referring to FIGS. 5 and 6, an object o may include a lane OB10, a nearby vehicle OB11, a pedestrian OB12, a two-wheeled vehicle OB13, a traffic signal OB14 and OB15, a light, a road, a structure, a bump, a geographical feature, an animal, etc.

The lane OB10 may be a lane in which the vehicle 100 is traveling (hereinafter, referred to as the current driving lane), a lane next to the current driving lane, and a lane in which a vehicle travelling in the opposite direction is travelling. The lane OB10 may include left and right lines that define the lane.

The nearby vehicle OB11 may be a vehicle that is travelling in the vicinity of the vehicle 100. The nearby vehicle OB11 may be a vehicle within a predetermined distance from the vehicle 100. For example, the nearby vehicle OB11 may be a vehicle that is preceding or following the vehicle 100.

The pedestrian OB12 may be a person in the vicinity of the vehicle 100. The pedestrian OB12 may be a person within a predetermined distance from the vehicle 100. For example, the pedestrian OB12 may be a person on a sidewalk or on the roadway.

The two-wheeled vehicle OB13 is a vehicle that is located in the vicinity of the vehicle 100 and moves with two wheels. The two-wheeled vehicle OB13 may be a vehicle that has two wheels within a predetermined distance from the vehicle 100. For example, the two-wheeled vehicle OB13 may be a motorcycle or a bike on a sidewalk or the roadway.

The traffic signal may include a traffic light OB15, a traffic sign plate OB14, and a pattern or text painted on a road surface. The light may be light generated by a lamp provided in the nearby vehicle. The light may be light generated by a street light. The light may be solar light. The road may include a road surface, a curve, and slopes, such as an upward slope and a downward slope. The structure may be a body located around the road in the state of being fixed onto the ground. For example, the structure may include a streetlight, a roadside tree, a building, a traffic light, and a bridge. The geographical feature may include a mountain and a hill.

Meanwhile, the object may be classified as a movable object or a stationary object. For example, the movable object may include a nearby vehicle and a pedestrian. For example, the stationary object may include a traffic signal, a road, and a structure.

The object detection device 300 may include a camera 310, a radar 320, a lidar 330, an ultrasonic sensor 340, an infrared sensor 350, and a processor 370. Each component of the object detection device 300 may be separated from or integrated with the sensing unit 120, structurally or operatively.

In some embodiments, the object detection device 300 may further include other components in addition to the aforementioned components, or may not include some of the aforementioned components.

The camera 310 may be located at an appropriate position outside the vehicle 100 in order to acquire images of the outside of the vehicle 100. The camera 310 may be a mono camera, a stereo camera 310a, an Around View Monitoring (AVM) camera 310b, or a 360-degree camera.

Using various image processing algorithms, the camera 310 may acquire location information of an object, information on distance to the object, and information on speed relative to the object.

For example, based on change in size over time of an object in acquired images, the camera 310 may acquire information on distance to the object and information on speed relative to the object.

For example, the camera 310 may acquire the information on distance to the object and the information on speed relative to the object by utilizing a pin hole model or by profiling a road surface.

For example, the camera 310 may acquire the information on distance to the object and the information on the speed relative to the object, based on information on disparity of stereo images acquired by a stereo camera 310a.

For example, the camera 310 may be disposed near a front windshield in the vehicle 100 in order to acquire images of the front of the vehicle 100. Alternatively, the camera 310 may be disposed around a front bumper or a radiator grill.

In another example, the camera 310 may be disposed near a rear glass in the vehicle 100 in order to acquire images of the rear of the vehicle 100. Alternatively, the camera 310 may be disposed around a rear bumper, a trunk, or a tailgate.

In yet another example, the camera 310 may be disposed near at least one of the side windows in the vehicle 100 in order to acquire images of the side of the vehicle 100. Alternatively, the camera 310 may be disposed around a side mirror, a fender, or a door.

The camera 310 may provide an acquired image to the processor 370.

The radar 320 may include an electromagnetic wave transmission unit and an electromagnetic wave reception unit. The radar 320 may be realized as a pulse radar or a continuous wave radar depending on the principle of emission of an electronic wave. In addition, the radar 320 may be realized as a Frequency Modulated Continuous Wave (FMCW) type radar or a Frequency Shift Keying (FSK) type radar depending on the waveform of a signal.

The radar 320 may detect an object through the medium of an electromagnetic wave by employing a time of flight (TOF) scheme or a phase-shift scheme, and may detect a location of the detected object, the distance to the detected object, and the speed relative to the detected object.

The radar 320 may be located at an appropriate position outside the vehicle 100 in order to sense an object located in front of the vehicle 100, an object located to the rear of the vehicle 100, or an object located to the side of the vehicle 100.

The lidar 330 may include a laser transmission unit and a laser reception unit. The lidar 330 may be implemented by the TOF scheme or the phase-shift scheme.

The lidar 330 may be implemented as a drive type lidar or a non-drive type lidar. When implemented as the drive type lidar, the lidar 300 may rotate by a motor and detect an object in the vicinity of the vehicle 100. When implemented as the non-drive type lidar, the lidar 300 may utilize a light steering technique to detect an object located within a predetermined distance from the vehicle 100.

The lidar 330 may detect an object through the medium of laser light by employing the TOF scheme or the phase-shift scheme, and may detect a location of the detected object, the distance to the detected object, and the speed relative to the detected object. The lidar 330 may be located at an appropriate position outside the vehicle 100 in order to sense an object located in front of the vehicle 100, an object located to the rear of the vehicle 100, or an object located to the side of the vehicle 100.

The ultrasonic sensor 340 may include an ultrasonic wave transmission unit and an ultrasonic wave reception unit. The ultrasonic sensor 340 may detect an object based on an ultrasonic wave, and may detect a location of the detected object, the distance to the detected object, and the speed relative to the detected object. The ultrasonic sensor 340 may be located at an appropriate position outside the vehicle 100 in order to detect an object located in front of the vehicle 100, an object located to the rear of the vehicle 100, and an object located to the side of the vehicle 100.

The infrared sensor 350 may include an infrared light transmission unit and an infrared light reception unit. The infrared sensor 340 may detect an object based on infrared light, and may detect a location of the detected object, the distance to the detected object, and the speed relative to the detected object. The infrared sensor 350 may be located at an appropriate position outside the vehicle 100 in order to sense an object located in front of the vehicle 100, an object located to the rear of the vehicle 100, or an object located to the side of the vehicle 100.

The processor 370 may control the overall operation of each unit of the object detection device 300. The processor 370 may detect or classify an object by comparing data sensed by the camera 310, the radar 320, the lidar 330, the ultrasonic sensor 340, and the infrared sensor 350 with pre-stored data.

The processor 370 may detect and track an object based on acquired images. The processor 370 may, for example, calculate the distance to the object and the speed relative to the object.

For example, the processor 370 may acquire information on the distance to the object and information on the speed relative to the object based on a variation in size over time of the object in acquired images.

In another example, the processor 370 may acquire information on the distance to the object or information on the speed relative to the object by employing a pin hole model or by profiling a road surface.

In yet another example, the processor 370 may acquire information on the distance to the object and information on the speed relative to the object based on information on disparity of stereo images acquired from the stereo camera 310a.

The processor 370 may detect and track an object based on a reflection electromagnetic wave which is formed as a result of reflection a transmission electromagnetic wave by the object. Based on the electromagnetic wave, the processor 370 may, for example, calculate the distance to the object and the speed relative to the object.

The processor 370 may detect and track an object based on a reflection laser light which is formed as a result of reflection of transmission laser by the object. Based on the laser light, the processor 370 may, for example, calculate the distance to the object and the speed relative to the object.

The processor 370 may detect and track an object based on a reflection ultrasonic wave which is formed as a result of reflection of a transmission ultrasonic wave by the object. Based on the ultrasonic wave, the processor 370 may, for example, calculate the distance to the object and the speed relative to the object.

The processor 370 may detect and track an object based on reflection infrared light which is formed as a result of reflection of transmission infrared light by the object. Based on the infrared light, the processor 370 may, for example, calculate the distance to the object and the speed relative to the object.

As described before, once the vehicle 100 starts the learning mode in response to a user input to the input unit 210, the processor 370 may store data sensed by the camera 310, the radar 320, the lidar 330, the ultrasonic sensor 340, and the infrared sensor 350 in the memory 140.

Each step of the learning mode based on analysis of stored data, and an operating mode following the learning mode will be described later in detail in relation to the operation system 700. According to an embodiment, the object detection device 300 may include a plurality of processors 370 or no processor 370. For example, the camera 310, the radar 320, the lidar 330, the ultrasonic sensor 340, and the infrared sensor 350 may include individual processors.

In a case where the object detection device 300 does not include the processor 370, the object detection device 300 may operate under control of the controller 170 or a processor inside the vehicle 100. The object detection device 300 may operate under control of the controller 170.

The communication device 400 is configured to perform communication with an external device. Here, the external device may be a nearby vehicle, a mobile terminal, or a server. To perform communication, the communication device 400 may include at least one selected from among a transmission antenna, a reception antenna, a Radio Frequency (RF) circuit capable of implementing various communication protocols, and an RF device.

The communication device 400 may include a short-range communication unit 410, a location information unit 420, a V2X communication unit 430, an optical communication unit 440, a broadcast transmission and reception unit 450, an Intelligent Transport Systems (ITS) communication unit 460, and a processor 470. In some embodiments, the communication device 400 may further include other components in addition to the aforementioned components, or may not include some of the aforementioned components.

The short-range communication unit 410 is configured to perform short-range communication. The short-range communication unit 410 may support short-range communication using at least one selected from among Bluetooth™, Radio Frequency IDdentification (RFID), Infrared Data Association (IrDA), Ultra-WideBand (UWB), ZigBec, Near Field Communication (NFC), Wireless-Fidelity (Wi-Fi), Wi-Fi Direct, and Wireless USB (Wireless Universal Serial Bus). The short-range communication unit 410 may form wireless area networks to perform short-range communication between the vehicle 100 and at least one external device.

The location information unit 420 is configured to acquire location information of the vehicle 100. For example, the location information unit 420 may include a Global Positioning System (GPS) module or a Differential Global Positioning System (DGPS) module.

The V2X communication unit 430 is configured to perform wireless communication between a vehicle and a server (that is, vehicle to infra (V2I) communication), wireless communication between a vehicle and a nearby vehicle (that is, vehicle to vehicle (V2V) communication), or wireless communication between a vehicle and a pedestrian (that is, vehicle to pedestrian (V2P) communication).

The optical communication unit 440 is configured to perform communication with an external device through the medium of light. The optical communication unit 440 may include a light emitting unit, which converts an electrical signal into an optical signal and transmits the optical signal to the outside, and a light receiving unit which converts a received optical signal into an electrical signal. In some embodiments, the light emitting unit may be integrally formed with a lamp provided included in the vehicle 100.

The broadcast transmission and reception unit 450 is configured to receive a broadcast signal from an external broadcasting management server or transmit a broadcast signal to the broadcasting management server through a broadcasting channel. The broadcasting channel may include a satellite channel, and a terrestrial channel. The broadcast signal may include a TV broadcast signal, a radio broadcast signal, and a data broadcast signal.

The ITS communication unit 460 may exchange information, data, or signals with a traffic system. The ITS communication unit 460 may provide acquired information or data to the traffic system. The ITS communication unit 460 may receive information, data, or signals from the traffic system. For example, the ITS communication unit 460 may receive traffic information from the traffic system and provide the traffic information to the controller 170. In another example, the ITS communication unit 460 may receive a control signal from the traffic system, and provide the control signal to the controller 170 or a processor provided in the vehicle 100.

The processor 470 may control the overall operation of each unit of the communication device 400. In some embodiments, the communication device 400 may include a plurality of processors 470, or may not include the processor 470. In a case where the communication device 400 does not include the processor 470, the communication device 400 may operate under control of the controller 170 or a processor of a device inside of the vehicle 100.

Meanwhile, the communication device 400 may implement a vehicle display device, together with the user interface device 200. In this case, the vehicle display device may be referred to as a telematics device or an Audio Video Navigation (AVN) device. The communication device 400 may operate under control of the controller 170.

The maneuvering device 500 is configured to receive a user input for driving the vehicle 100. In the manual mode, the vehicle 100 may operate based on a signal provided by the maneuvering device 500. The maneuvering device 500 may include a steering input device 510, an acceleration input device 530, and a brake input device 570.

The steering input device 510 may receive a user input with regard to the direction of travel of the vehicle 100. The steering input device 510 may take the form of a wheel to enable a steering input through the rotation thereof. In some embodiments, the steering input device may be provided as a touchscreen, a touch pad, or a button.

The acceleration input device 530 may receive a user input for acceleration of the vehicle 100. The brake input device 570 may receive a user input for deceleration of the vehicle 100. Each of the acceleration input device 530 and the brake input device 570 may take the form of a pedal. In some embodiments, the acceleration input device or the break input device may be configured as a touch screen, a touch pad, or a button.

The maneuvering device 500 may operate under control of the controller 170.

The vehicle drive device 600 is configured to electrically control the operation of various devices of the vehicle 100. The vehicle drive device 600 may include a power train drive unit 610, a chassis drive unit 620, a door/window drive unit 630, a safety apparatus drive unit 640, a lamp drive unit 650, and an air conditioner drive unit 660. In some embodiments, the vehicle drive device 600 may further include other components in addition to the aforementioned components, or may not include some of the aforementioned components. Meanwhile, the vehicle drive device 600 may include a processor. Each unit of the vehicle drive device 600 may include its own processor.

The power train drive unit 610 may control the operation of a power train. The power train drive unit 610 may include a power source drive unit 611 and a transmission drive unit 612.

The power source drive unit 611 may control a power source of the vehicle 100. In the case in which a fossil fuel-based engine is the power source, the power source drive unit 611 may perform electronic control of the engine. As such the power source drive unit 611 may control, for example, the output torque of the engine. The power source drive unit 611 may adjust the output toque of the engine under control of the controller 170.

In a case where an electric motor is the power source, the power source drive unit 611 may control the motor. The power source drive unit 610 may control, for example, the RPM and toque of the motor under control of the controller 170.

The transmission drive unit 612 may control a transmission. The transmission drive unit 612 may adjust the state of the transmission. The transmission drive unit 612 may adjust a state of the transmission to a drive (D), reverse (R), neutral (N), or park (P) state. Meanwhile, in a case where an engine is the power source, the transmission drive unit 612 may adjust a gear-engaged state to the drive position D.

The chassis drive unit 620 may control the operation of a chassis. The chassis drive unit 620 may include a steering drive unit 621, a brake drive unit 622, and a suspension drive unit 623.

The steering drive unit 621 may perform electronic control of a steering apparatus provided inside the vehicle 100. The steering drive unit 621 may change the direction of travel of the vehicle 100.

The brake drive unit 622 may perform electronic control of a brake apparatus provided inside the vehicle 100. For example, the brake drive unit 622 may reduce the speed of the vehicle 100 by controlling the operation of a brake located at a wheel.

Meanwhile, the brake drive unit 622 may control a plurality of brakes individually. The brake drive unit 622 may apply a different degree-braking force to each wheel.

The suspension drive unit 623 may perform electronic control of a suspension apparatus inside the vehicle 100. For example, when the road surface is uneven, the suspension drive unit 623 may control the suspension apparatus so as to reduce the vibration of the vehicle 100. Meanwhile, the suspension drive unit 623 may control a plurality of suspensions individually.

The door/window drive unit 630 may perform electronic control of a door apparatus or a window apparatus inside the vehicle 100. The door/window drive unit 630 may include a door drive unit 631 and a window drive unit 632.

The door drive unit 631 may control the door apparatus. The door drive unit 631 may control opening or closing of a plurality of doors included in the vehicle 100. The door drive unit 631 may control opening or closing of a trunk or a tail gate. The door drive unit 631 may control opening or closing of a sunroof.

The window drive unit 632 may perform electronic control of the window apparatus. The window drive unit 632 may control opening or closing of a plurality of windows included in the vehicle 100.

The safety apparatus drive unit 640 may perform electronic control of various safety apparatuses provided inside the vehicle 100. The safety apparatus drive unit 640 may include an airbag drive unit 641, a safety belt drive unit 642, and a pedestrian protection equipment drive unit 643.

The airbag drive unit 641 may perform electronic control of an airbag apparatus inside the vehicle 100. For example, upon detection of a dangerous situation, the airbag drive unit 641 may control an airbag to be deployed.

The safety belt drive unit 642 may perform electronic control of a seatbelt apparatus inside the vehicle 100. For example, upon detection of a dangerous situation, the safety belt drive unit 642 may control passengers to be fixed onto seats 110FL, 110FR, 110RL, and 110RR with safety belts.

The pedestrian protection equipment drive unit 643 may perform electronic control of a hood lift and a pedestrian airbag. For example, upon detection of a collision with a pedestrian, the pedestrian protection equipment drive unit 643 may control a hood lift and a pedestrian airbag to be deployed.

The lamp drive unit 650 may perform electronic control of various lamp apparatuses provided inside the vehicle 100.

The air conditioner drive unit 660 may perform electronic control of an air conditioner inside the vehicle 100. For example, when the inner temperature of the vehicle 100 is high, an air conditioner drive unit 660 may operate the air conditioner so as to supply cool air to the inside of the vehicle 100.

The vehicle drive device 600 may include a processor. Each unit of the vehicle dive device 600 may include its own processor. The vehicle drive device 600 may operate under control of the controller 170.

The operation system 700 is a system for controlling the overall driving operation of the vehicle 100. The operation system 700 may operate in the autonomous driving mode.

The operation system 700 may include the driving system 710, the vehicle pulling-out system 740, and the vehicle parking system 750. In some embodiments, the operation system 700 may further include other components in addition to the aforementioned components, or may not include some of the aforementioned component. Meanwhile, the operation system 700 may include a processor. Each unit of the operation system 700 may include its own processor.

Meanwhile, the operation system 700 may control driving in the autonomous mode based on learning. In this case, the learning mode and an operating mode based on the premise of completion of learning may be performed. A description will be given below of a method of executing the learning mode and the operating mode by the processor of the operation system 700.

The learning mode may be performed in the afore-described manual mode. In the learning mode, the processor of the operation system 700 may learn a driving route and ambient environment of the vehicle 100.

The learning of the driving route may include generating map data for a route in which the vehicle 100 drives. Particularly, the processor of the operation system 700 may generate map data based on information detected through the object detection device 300 during driving from a departure to a destination.

The learning of the ambient environment may include storing and analyzing information about an ambient environment of the vehicle 100 during driving and parking. Particularly, the processor of the operation system 700 may store and analyze the information about the ambient environment of the vehicle based on information detected through the object detection device 300 during parking of the vehicle 100, for example, information about a location, size, and a fixed (or mobile) obstacle of a parking space.

The operating mode may be performed in the afore-described autonomous mode. The operating mode will be described based on the premise that the driving route or the ambient environment has been learned in the learning mode.

The operating mode may be performed in response to a user input through the input unit 210, or when the vehicle 100 reaches the learned driving route and parking space, the operating mode may be performed automatically.

The operating mode may include a semi-autonomous operating mode requiring some user's manipulations of the maneuvering device 500, and a full autonomous operating mode requiring no user's manipulation of the maneuvering device 500.

According to an embodiment, the processor of the operation system 700 may drive the vehicle 100 along the learned driving route by controlling the operation system 710 in the operating mode.

According to an embodiment, the processor of the operation system 700 may pull out the vehicle 100 from the learned parking space by controlling the vehicle pulling-out system 740 in the operating mode.

According to an embodiment, the processor of the operation system 700 may park the vehicle 100 in the learned parking space by controlling the vehicle parking system 750 in the operating mode. Meanwhile, in some embodiments, in a case where the operation system 700 is implemented as software, the operation system 700 may be a subordinate concept of the controller 170.

Meanwhile, in some embodiments, the operation system 700 may be a concept including at least one selected from among the user interface device 200, the object detection device 300, the communication device 400, the vehicle drive device 600, and the controller 170.

The driving system 710 may perform driving of the vehicle 100. The driving system 710 may perform driving of the vehicle 100 by providing a control signal to the vehicle drive device 600 in response to reception of navigation information from the navigation system 770.

The driving system 710 may perform driving of the vehicle 100 by providing a control signal to the vehicle drive device 600 in response to reception of object information from the object detection device 300. The driving system 710 may perform driving of the vehicle 100 by providing a control signal to the vehicle drive device 600 in response to reception of a signal from an external device through the communication device 400.

Conceptually, the driving system 710 may be a system that drives the vehicle 100, including at least one of the user interface device 200, the object detection device 300, the communication device 400, the maneuvering device 500, the vehicle drive device 600, the navigation system 770, the sensing unit 120, or the controller 170. The driving system 710 may be referred to as a vehicle driving control device.

The vehicle pulling-out system 740 may perform an operation of pulling the vehicle 100 out of a parking space. The vehicle pulling-out system 740 may perform an operation of pulling the vehicle 100 out of a parking space, by providing a control signal to the vehicle drive device 600 in response to reception of navigation information from the navigation system 770.

The vehicle pulling-out system 740 may perform an operation of pulling the vehicle 100 out of a parking space, by providing a control signal to the vehicle drive device 600 in response to reception of object information from the object detection device 300.

The vehicle pulling-out system 740 may perform an operation of pulling the vehicle 100 out of a parking space, by providing a control signal to the vehicle drive device 600 in response to reception of a signal from an external device.

Conceptually, the vehicle pulling-out system 740 may be a system that performs pulling-out of the vehicle 100, including at least one of the user interface device 200, the object detection device 300, the communication device 400, the maneuvering device 500, the vehicle drive device 600, the navigation system 770, the sensing unit 120, or the controller 170.

The vehicle pulling-out system 740 may be referred to as a vehicle pulling-out control device.

The vehicle parking system 750 may perform an operation of parking the vehicle 100 in a parking space. The vehicle parking system 750 may perform an operation of parking the vehicle 100 in a parking space, by providing a control signal to the vehicle drive device 600 in response to reception of navigation information from the navigation system 770.

The vehicle parking system 750 may perform an operation of parking the vehicle 100 in a parking space, by providing a control signal to the vehicle drive device 600 in response to reception of object information from the object detection device 300.

The vehicle parking system 750 may perform an operation of parking the vehicle 100 in a parking space, by providing a control signal to the vehicle drive device 600 in response to reception of a signal from an external device.

Conceptually, the vehicle parking system 750 may be a system that performs parking of the vehicle 100, including at least one of the user interface device 200, the object detection device 300, the communication device 400, the maneuvering device 500, the vehicle drive device 600, the navigation system 770, the sensing unit 120, or the controller 170.

The vehicle parking system 750 may be referred to as a vehicle parking control device.

The navigation system 770 may provide navigation information. The navigation information may include at least one selected from among map information, information on a set destination, information on a route to the set destination, information on various objects along the route, lane information, and information on a current location of the vehicle.

The navigation system 770 may include a memory and a processor. The memory may store navigation information. The processor may control the operation of the navigation system 770.

In some embodiments, the navigation system 770 may update pre-stored information by receiving information from an external device through the communication device 400. In some embodiments, the navigation system 770 may be classified as an element of the user interface device 200.

Figure 8:
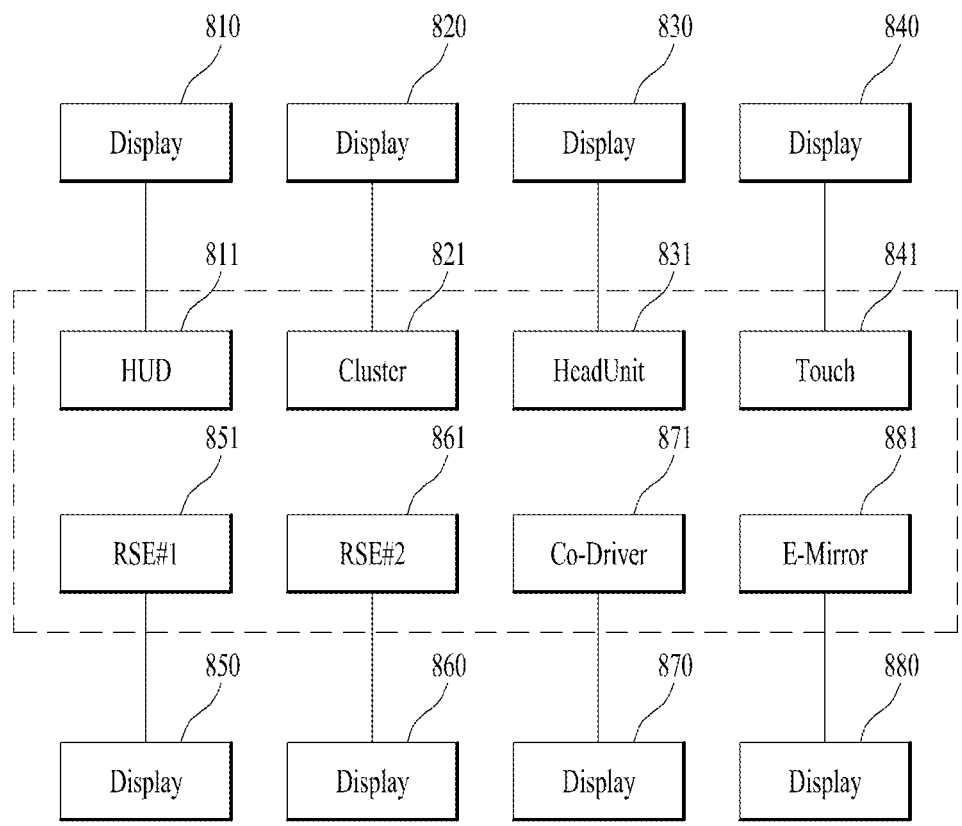
FIG. 8 is a diagram showing a domain control system of the prior art.

FIG. 8 is a diagram showing a domain control system of the prior art.

Each of displays 810 to 880 shown in FIG. 8 may be one of the display units 251 respectively disposed in the region of the steering wheel, the region 251*a*, 251*b*, or 251*e* of the instrument panel, the region 251*d* of the seat, the region 251*f* of each pillar, the region 251*g* of the door, the region of the center console, the region of the head lining, the region of the sun visor, the region 251*c* of the windshield, and the region 251*h* of the window described above in FIGS. 3 to 4.

Referring to FIG. 8, in the domain control system of the prior art, an individual ECU controls each of the displays 810 to 880. For example, a HUD 811, a cluster 821, a head unit 831, a touch 841, a rear seat entertainment (RSE) #1 851, a RSE #2 861, a co-driver 871, and an e-mirror 881 respectively control the displays 810 to 880. Alternatively, unlike that shown in FIG. 8, a consolidation system that provides instrument cluster, head-unit, and head-up display functions through three to four displays based on a single ECU has also been introduced.

In one example, recently, as a display that supports high resolution is added to an in-vehicle infotainment domain, requirements for performances of the display and the domain control system that controls the display are increasing. However, the domain control system of the prior art has problems that: (i) a HW headroom for adding an ECU that supports a new function is insufficient; and (ii) a high performance requirement, especially, a large number of displays are not be able to be controlled by the single ECU.

Figure 9:
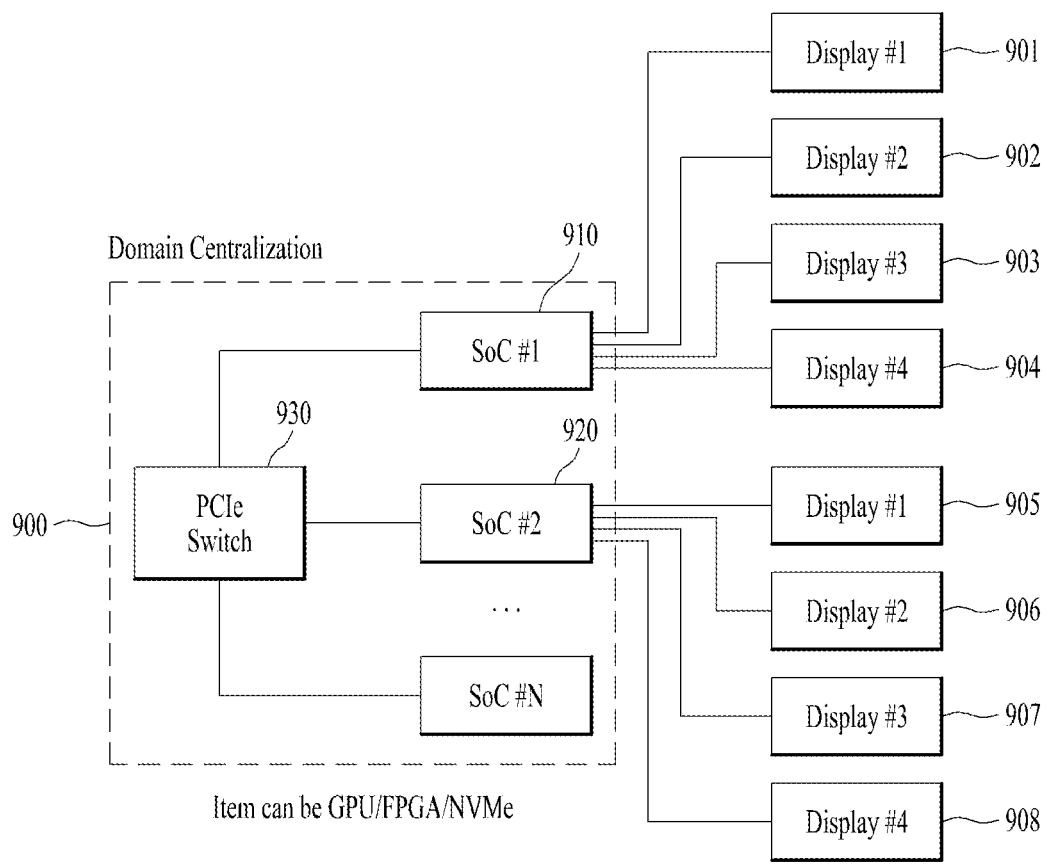
FIG. 9 is a diagram showing a block diagram of a cockpit domain controller (CDC) in a workload distribution scenario between SoCs according to an aspect of the present disclosure.

FIG. 9 is a diagram showing a block diagram of a cockpit domain controller (CDC) in a workload distribution scenario between SoCs according to an aspect of the present disclosure.

Referring to FIG. 9, the present disclosure proposes a cockpit domain controller (CDC) system based on multiple ECUs through domain centralization. Hereinafter, the CDC system may be referred to as an SoC system or a device disposed in the vehicle. In addition, a SoC #1 may be named a first SoC, and a SoC #2 may be named a second SoC.

More specifically, in FIG. 9, a plurality of SoCs (System on Chips, 910 to 920) are connected to each other through a PCIe switch 930 to be subjected to the domain centralization, and each of which may control a plurality of (e.g., 4) displays. In one example, displays 901 to 908 of FIG. 9 may be the displays 810 to 880 of FIG. 8.

A peripheral component interconnect express (PCIe) switch 930 may be a high-speed serial computer expansion bus standard or a switch for implementing the same. The PCIe is designed to replace existing PCI, PCI-X, and accelerated graphics port (AGP) bus standard. In one example, the PCIe switch 930 shown in FIG. 9 is exemplary and does not limit the scope of the present disclosure. That is, a predetermined input/output interface that exists between a CPU and an input/output device and enables data transmission therebetween may replace the PCIe switch 930.

The device disposed in the vehicle according to an aspect of the present disclosure, that is, the cockpit domain controller (CDC) system is able to solve the problems that: (i) the HW headroom for adding the ECU that supports the new function is insufficient; and (ii) the high performance requirement, especially, the large number of displays are not be able to be controlled by the single ECU.

More specifically, the CDC system proposed by the present disclosure is advantageous in terms of HW upgrade and exchange, and is advantageous for workload distribution using a resource (e.g., workload distribution in the infotainment domain and workload distribution with an ADAS domain). The SoCs 910 and 920 and the PCIe switch 930 shown in FIG. 9 will be described in detail below.

Figure 10:
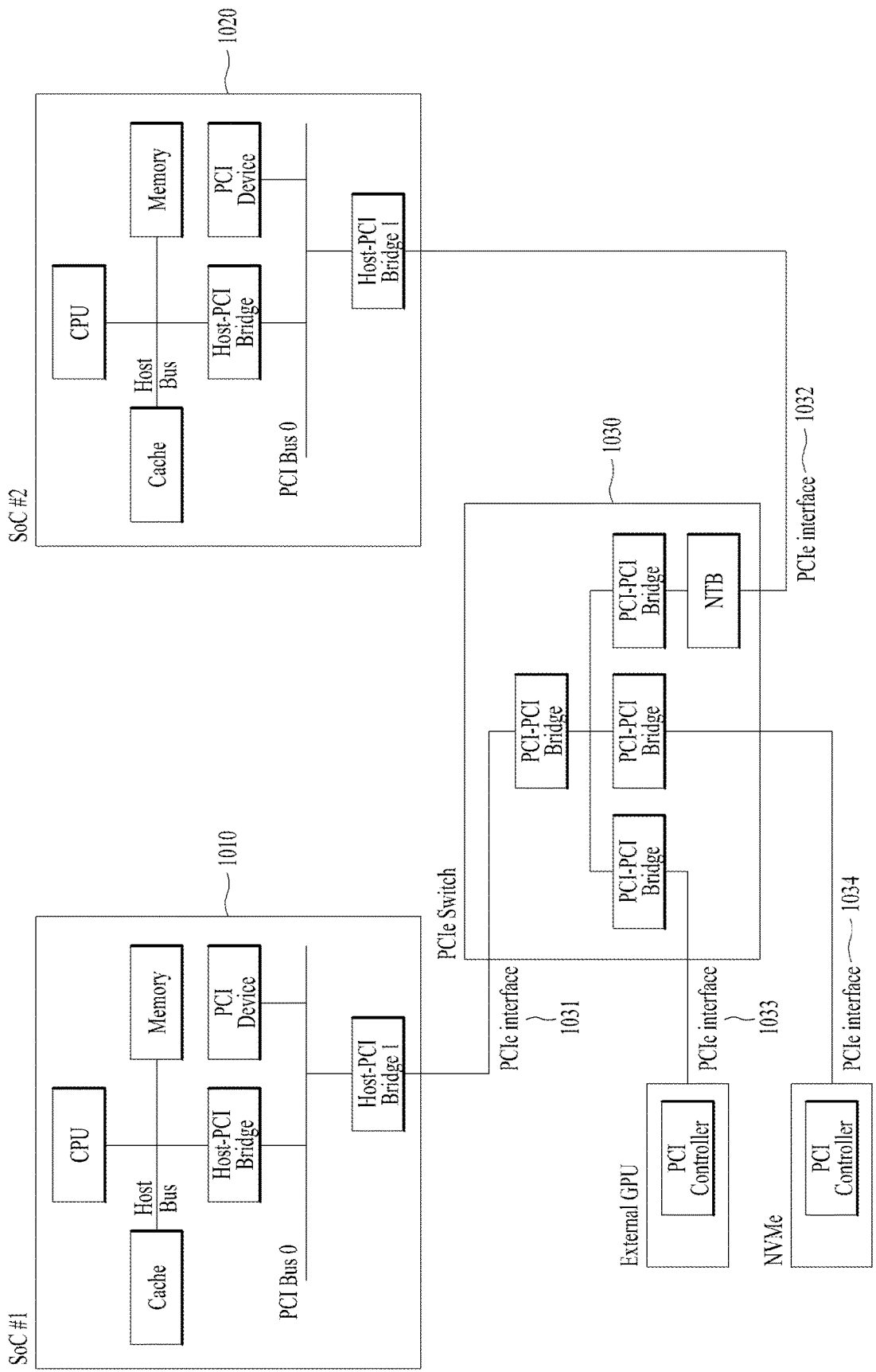
FIG. 10 shows a detailed configuration of a cockpit domain controller system based on a PCIe interconnection in a workload distribution scenario between SoCs according to an aspect of the present disclosure.

FIG. 10 shows a detailed configuration of a cockpit domain controller system based on a PCIe interconnection in a workload distribution scenario between SoCs according to an aspect of the present disclosure.

A CDC system according to an aspect of the present disclosure may be composed of a plurality of SoCs 1010 and 1020 having PCIe interfaces 1031, 1032, 1033, and 1034 with a PCIe switch 1030, a graphics processing unit (GPU) 1040, a non-volatile memory express (NVMe) 1050, a field-programmable gate array (FPGA) device (not shown), and the like.

As described above with reference to FIG. 9, each of the SoCs 1010 and 1020 may control a plurality of displays, and may be composed of a CPU, a cache, a memory, a host-PCI bridge, and a PCI device. In one example, one or more of the aforementioned components may be omitted, and a component not shown may be added to the SoCs 1010 and 1020.

The PCI Switch 1030 is composed of a plurality of PCI-PCI bridges, and is able to be connected to the SoCs 1010 and 1020, the external GPU 1040, and the NVMe 1050 through the plurality of PCIe interfaces 1031, 1032, 1033, and 1034. In one example, according to an aspect of the present disclosure, the plurality of PCIe interfaces 1031, 1032, 1033, and 1034 may be wired interfaces.

According to the CDC system of the present disclosure proposed through FIGS. 9 to 10, it is possible to respond to new features such as computing performance increase or storage expansion. In addition, performance requirements for each grade may be satisfied by attaching the devices through the PCIe interface. For example, when a GPU performance is insufficient, the performance requirements may be satisfied by upgrading the SoC or installing an additional GPU.

Figure 11:
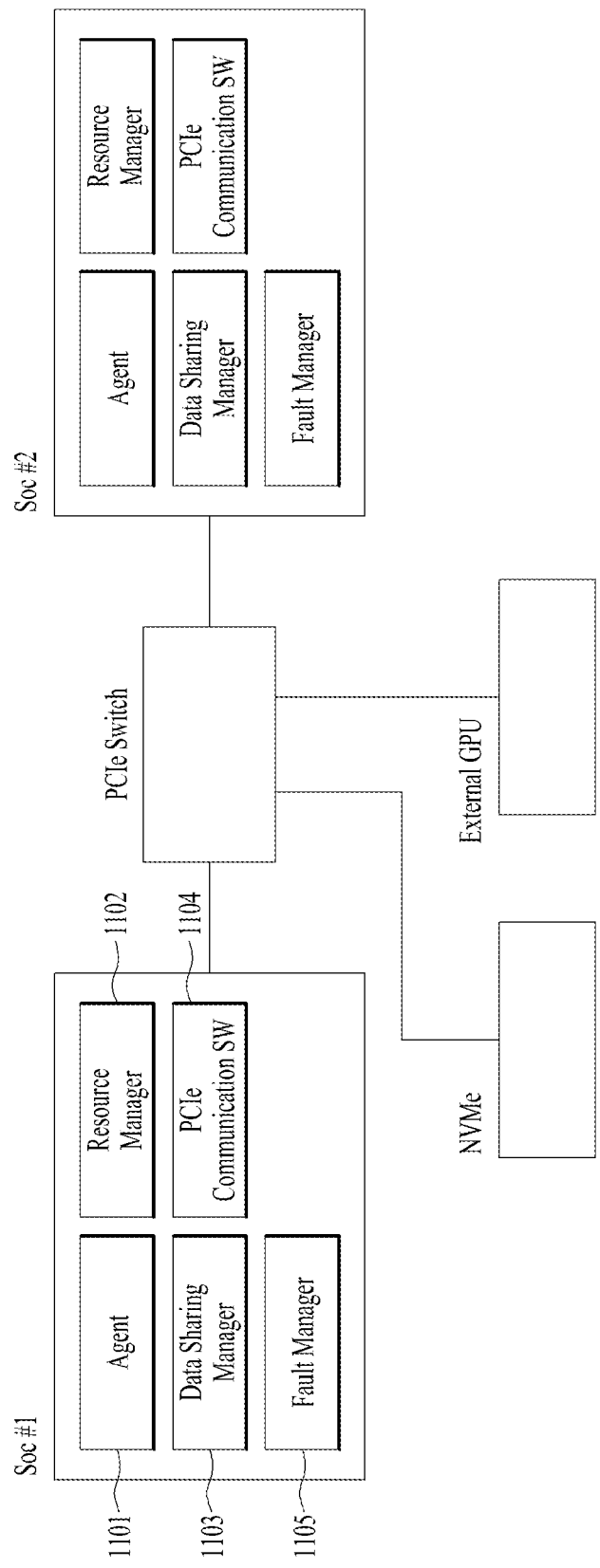
FIG. 11 shows a detailed configuration of a cockpit domain controller system based on a PCIe interconnection in a workload distribution scenario between SoCs according to an aspect of the present disclosure.

FIG. 11 shows a detailed configuration of a cockpit domain controller system based on a PCIe interconnection in a workload distribution scenario between SoCs according to an aspect of the present disclosure.

A device (e.g., a SoC system or a CDC system) disposed in the vehicle according to an aspect of the present disclosure may include an agent 1101, a resource manager 1102, a data sharing manager 1103, PCIe communication SW 1104, and a fault manager 1105 to provide workload distribution and graphics/data sharing functions. In one example, an EP device (e.g., an NVMe and an external GPU) connected to a PCIe switch may operate in an assigned SoC system.

The agent 1101 performs distribution, to a local/remote, and parallel execution of launch of an application by checking a resource usage of a neighbor node and a self node, operates as a server/client in consideration of a node topology, and launches a container-based application for supporting a platform on different models.

The resource manager 1102 measures and manages resources such as CPU/Memory/GPU/DSP, calculates/manages a runtime resource of the server/client, and manages information of the app being launched.

The data sharing manager 1103 enables a connection between applications of different nodes using a PCIe interconnection that supports a Socket/SISCI scheme, and performs a function of sharing data. Through client/server function separation, in the data sharing, even when a client side does not know a location of a specific node that may be accessed, a server side may create and manage information such as an IP and a port for a socket, and an adapter number, a node ID, a segment ID, and the like for a SISCI, thereby enabling a connection therebetween with only a unique key.

The PCIe communication SW 1104 performs PCIe socket/SISCI communication through NT/DMA transfer control of the PCIe switch.

The fault manager 1105 detects a fault of the application and monitors a PCIe NT link error and a host failover state to perform a role of reporting such that the agent may handle the error.

Figure 12:
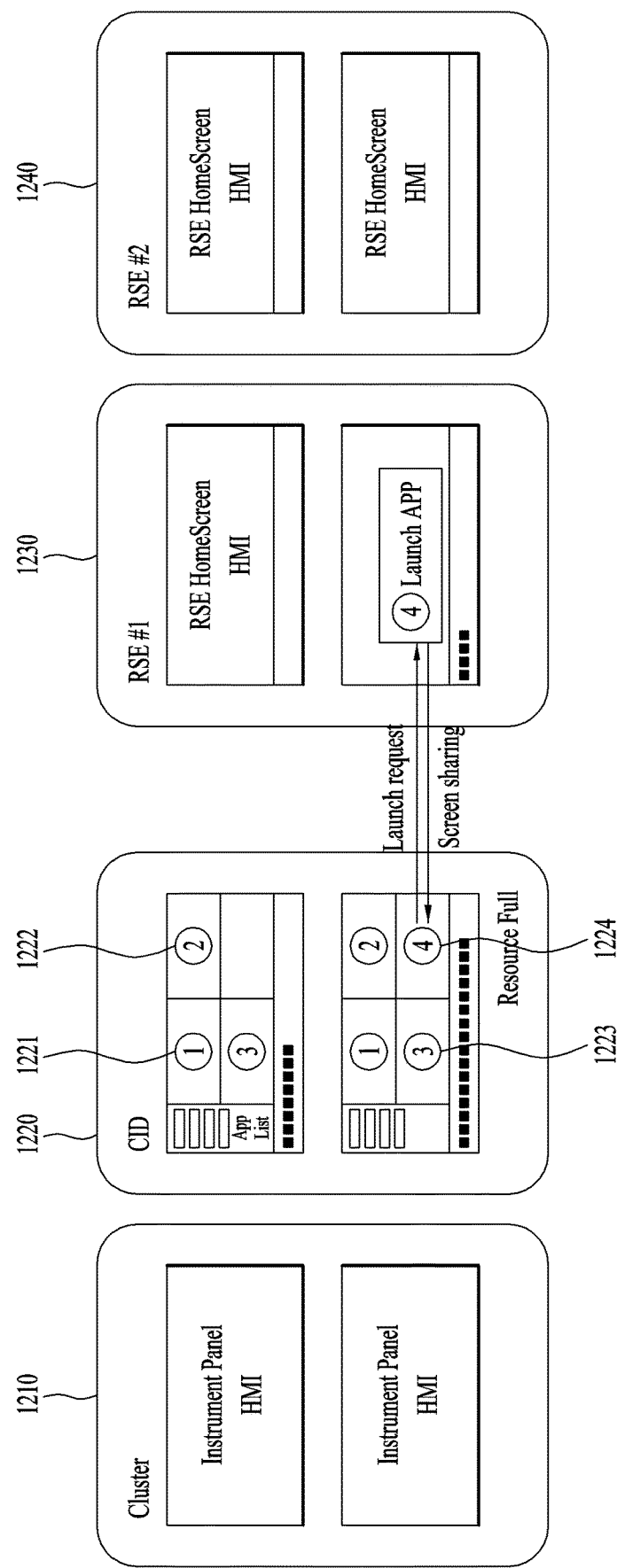
FIG. 12 is a diagram for illustrating a workload distribution scenario between SoCs according to an aspect of the present disclosure.

FIG. 12 is a diagram for illustrating a workload distribution scenario between SoCs according to an aspect of the present disclosure.

Specifically, FIG. 12 is a diagram for illustrating a method for driving an app using an available resource of a SoC #2 in a resource full state of a SoC #1 in a CDC system according to an aspect of the present disclosure. First, it is assumed that the SoC #1 controls two displays, which are a cluster 1210 and a central information display (CID) 1220, and the SoC #2 controls two displays, which are an RSE #1 1230 and an RSE #2 1240.

Referring to FIG. 12, a first application 1221, a second application 1222, and a third application 1223 are launched through the SoC #1, and are output from the CID 1220. The first to third applications may be, for example, a media application, a navigation application, or an algorithm computing application.

Then, when a fourth application 1224 is to be launched, the SoC #1 may be in the resource full state. Therefore, the SoC #1 requests the SoC #2 to launch the fourth application 1224. In addition, the SoC #2 may share a screen on which the fourth application 1224 is being launched to the SoC #1. Finally, the SoC #1 outputs the shared launch screen of the fourth application 1224 through the CID 1220.

According to an aspect of the present disclosure, the SoC #1 may be designed to request the SoC #2 to launch a specific application when a resource state of the SoC #1 is the resource full state and a resource state of the SoC #2 is not the resource full state. Alternatively, when the resource states of the SoC #1 and the SoC #2 are both the resource full state, the SoC #1 may control to terminate one of at least one application based on a predetermined priority. This will be described later in FIG. 14.

Figure 13:
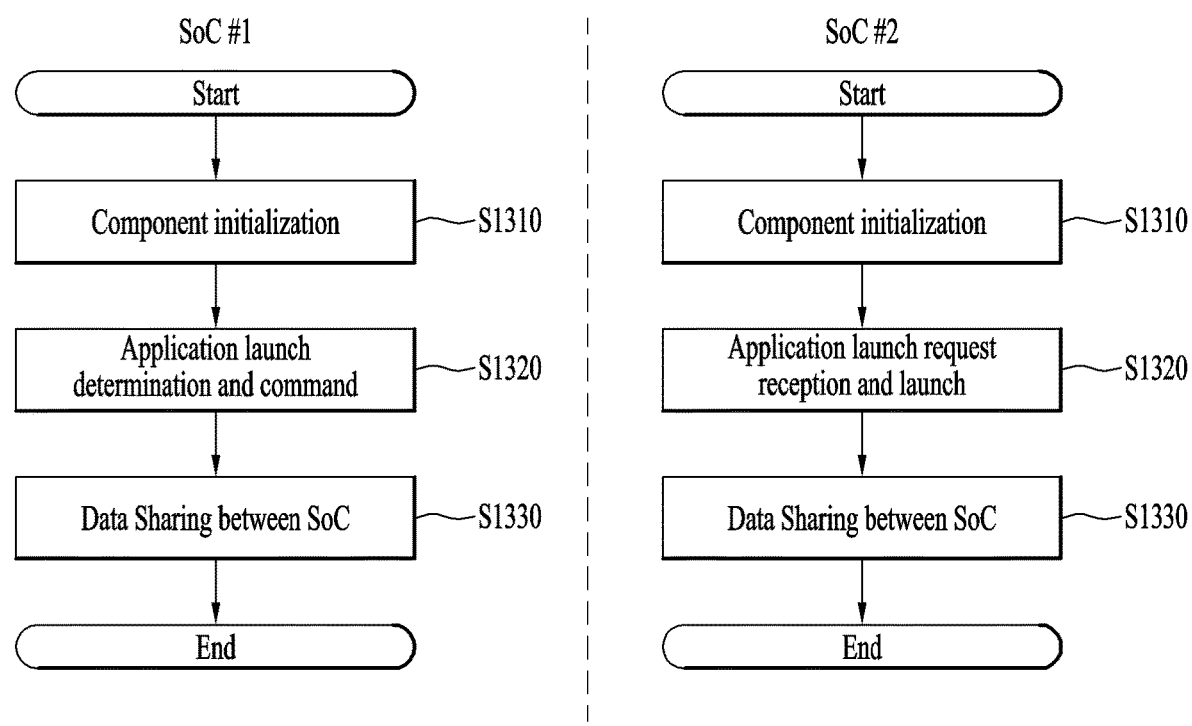
FIG. 13 is a diagram for illustrating a workload distribution scenario between SoCs according to an aspect of the present disclosure.

FIG. 13 is a diagram for illustrating a workload distribution scenario between SoCs according to an aspect of the present disclosure. Hereinafter, steps performed by the aforementioned SoCs (e.g., the SoC #1 and the SoC #2) for workload distribution will be described with reference to FIG. 13.

i) Component Initialization—The SoC #1 and the SoC #2 may drive the agent and a resource gathering for the application launch. The SoC #1 and the SoC #2 may initialize PCIe software (SW) for a PCIe connection between the SoCs, and drive data sharing. The SoC #1 and the SoC #2 may drive the fault manager for the fault detection.

ii) Application Launch—The SoC #1 may determine whether to drive the application in the local (e.g., the SoC #1) or the remote (e.g., the SoC #2). In particular, this may be determined based on available resources of the SoC #1 and the SoC #2.

iii) Data Sharing-When it is determined to drive the application in the remote (e.g., the SoC #2) in step ii), AV, surface sharing, and computation sharing may be performed between the SoC #1 and the SoC #2. In one example, the above-described steps will be described in more detail with reference to FIGS. 14 to 16 below.

Figure 14:
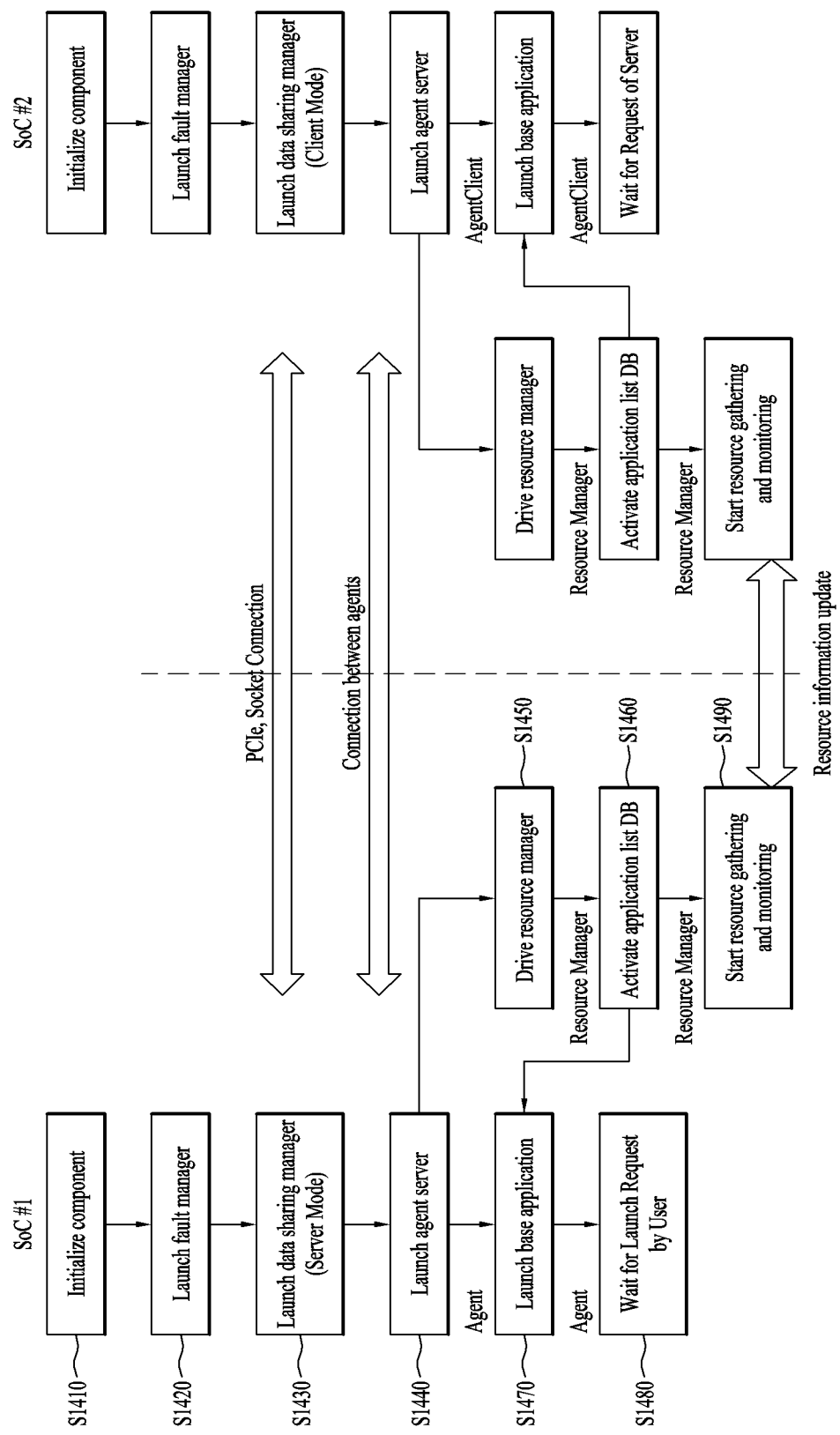
FIG. 14 is a diagram for illustrating component initialization in a workload distribution scenario between SoCs according to an aspect of the present disclosure.

FIG. 14 is a diagram for illustrating component initialization in a workload distribution scenario between SoCs according to an aspect of the present disclosure.

When the components are initialized (S1410), the SoC #1 launches the fault manager to initialize the PCIe communication SW, and monitors the PCIe NT link error and the host failover state (S1420). In addition, the fault detection of the application may be performed in this step.

The SoC #1 launches the data sharing manager to perform a socket/PCIe connection between the SoCs (S1430). In this connection, a server-client relationship may be formed between the SoC #1 and the SoC #2, and the server may create and manage IP/Port and PCIe DMA channel information predefined in a topology.

The SoC #1 launches the agent (or an agent server) (S1440) and drives the resource manager (S1450). The resource manager of the SoC #1 activates an application list DB to be executed (S1460). The agent server uses such information to launch a base application to be launched in the local (S1470), and waits for a user to launch the application (S1480). An agent client is connected to the agent server and waits for a request from the agent server.

In one example, the applications may be divided into (i) the base application to be launched at BootUp and (ii) a normal application launched by a request of the user. Among the normal applications, what may be launched in the client may be managed by a DB of each resource manager.

The resource manager may also manage information on the priority for forced termination (e.g., from level 1 to level 5, and the level S have the lowest priority). In addition, when there is no resource available for both of the local and the remote, the resource manager may forcefully terminate the normal application with a low priority with the agent.

Furthermore, the resource manager may collect information about itself and the remote (the client) using information of the socket/PCIe connection of the agent (S1490). That is, the resource manager may collect resources of the local and the remote, and manage and store information of resource available at moment or during an average time (N seconds).

Figure 15:
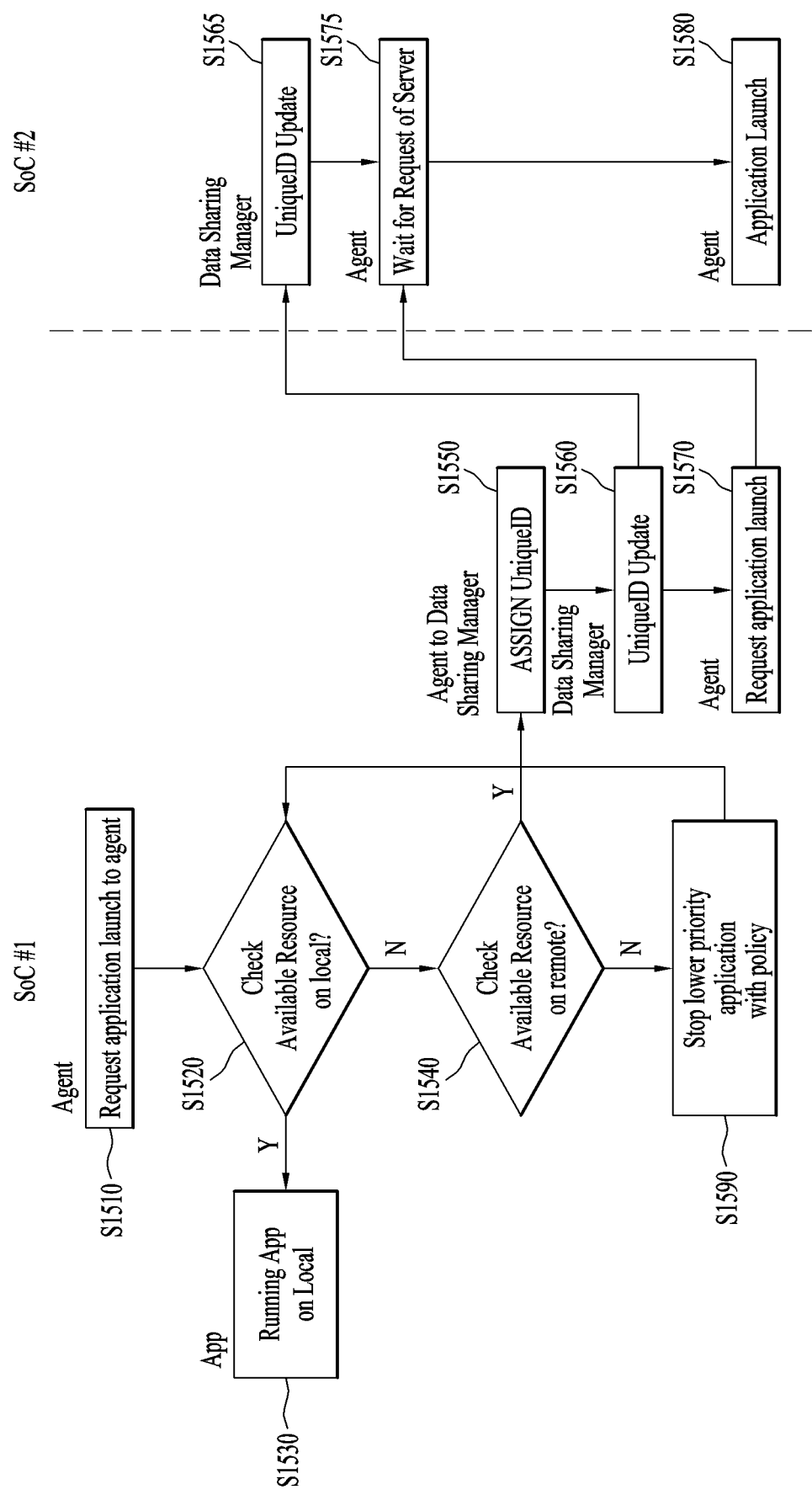
FIG. 15 is a diagram for illustrating application launch in a workload distribution scenario between SoCs according to an aspect of the present disclosure.

FIG. 15 is a diagram for illustrating application launch in a workload distribution scenario between SoCs according to an aspect of the present disclosure.

A description will be made on the premise that the component initialization has been completed based on each step of FIG. 14. When the launch of the normal application is requested from the user, the agent requests the available resource to the resource manager (S1510). The resource manager determines the resource available for the local (S1520).

When there is the resource available for the local of the SoC #1, the local launches the normal app (S1530).

When there is no resource available for the local of the SoC #1, the SoC #1 identifies a resource state of the remote (S1540), and creates a UniqueID for communication between the apps and assigns the UniqueID to the data sharing manager (S1550). The data sharing manager updates the UniqueID to be used for an app of a data sharing manager client (S1560 and S1565). The agent requests an AgentClient to launch the application (S1570).

The SoC #2 waits for a launch request from the server (S1575). The SoC #2 that has received the application launch request launches the application using the updated Unique ID (S1580).

In one example, when the application is not able to be launched in both the local/remote, the SoC #1 terminates the app in consideration of the predetermined priority of the normal application and background launch, and tries to launch the application again (S1590).

Figure 16:
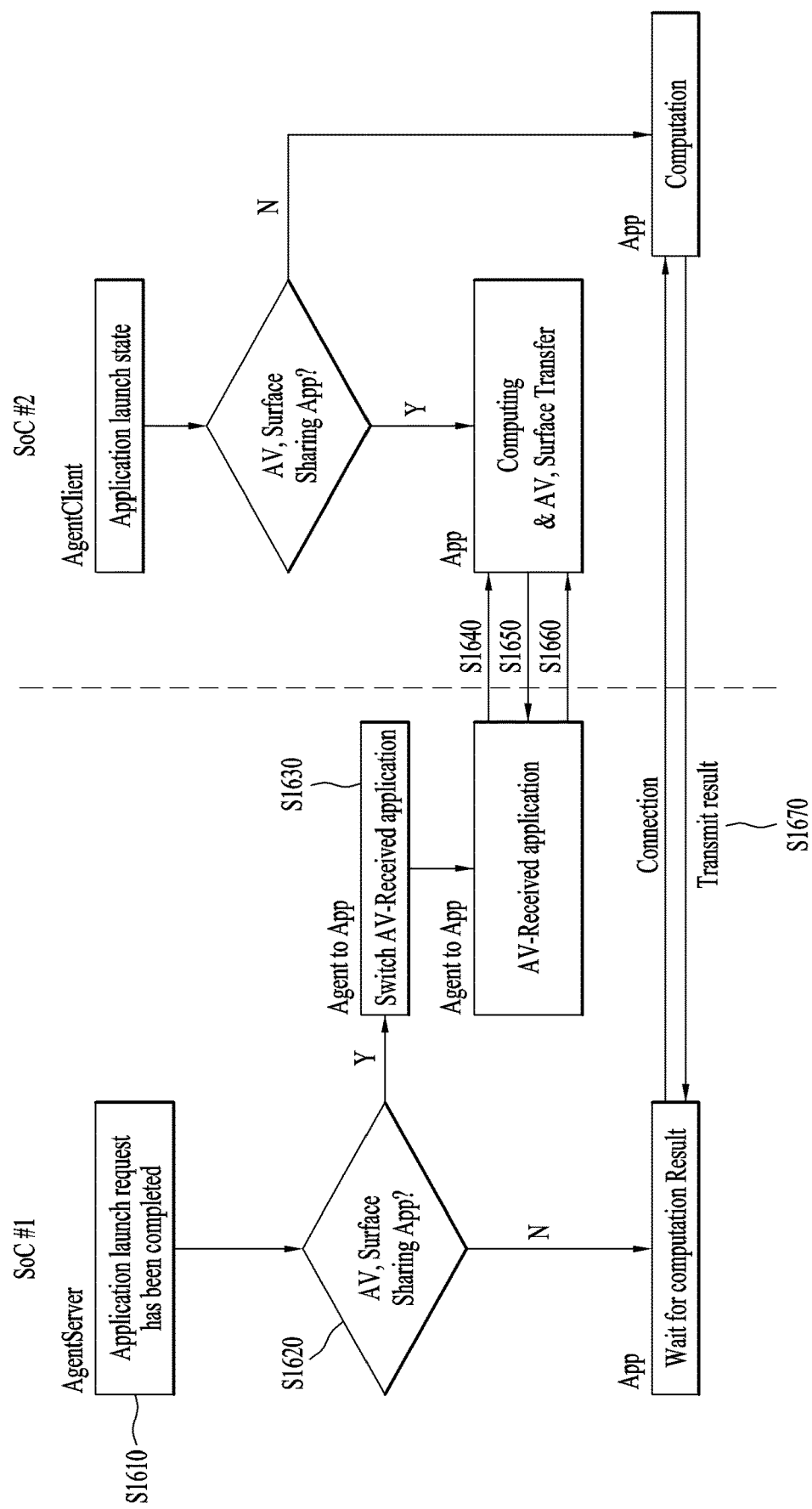
FIG. 16 is a diagram for illustrating data sharing in a workload distribution scenario between SoCs according to an aspect of the present disclosure.

FIG. 16 is a diagram for illustrating data sharing in a workload distribution scenario between the SoCs according to an aspect of the present disclosure.

A description will be made on the premise that the application launch request has been completed based on each step of FIG. 15. The SoC #1 requests the application launch to the SoC #2 (S1610). When the normal application is an audio video (AV) or surface sharing-capable application (S1620), the agent server prepares to launch the AV or surface-received application, and switch and receive the AV or surface-received application (S1630). The application executes a connection with the application of the SoC #2 through the socket/PCIe connection information acquired through the unique ID (S1640).

When the normal application is the AV or surface-shared application, the AgentClient (the SoC #2) may transmit rendering data to the AV or surface-received app of an AgentServer (the SoC #1) (S1650). In addition, in response to the transmission of the rendering data, the AgentServer (the SoC #1) may transmit a touch input to the AgentClient (the SoC #2) (S1660).

In one example, when the normal application is not the AV or surface sharing-capable application, a computing result may be transmitted through a connected channel (S1670).

A structure of transmitted/received data may be composed of a type and data. The type may include the touch input, the audio, the video, the surface, a command (launch/exit), and a computing result, and the data may include a length and a value of a value used in the type.

Figure 17:
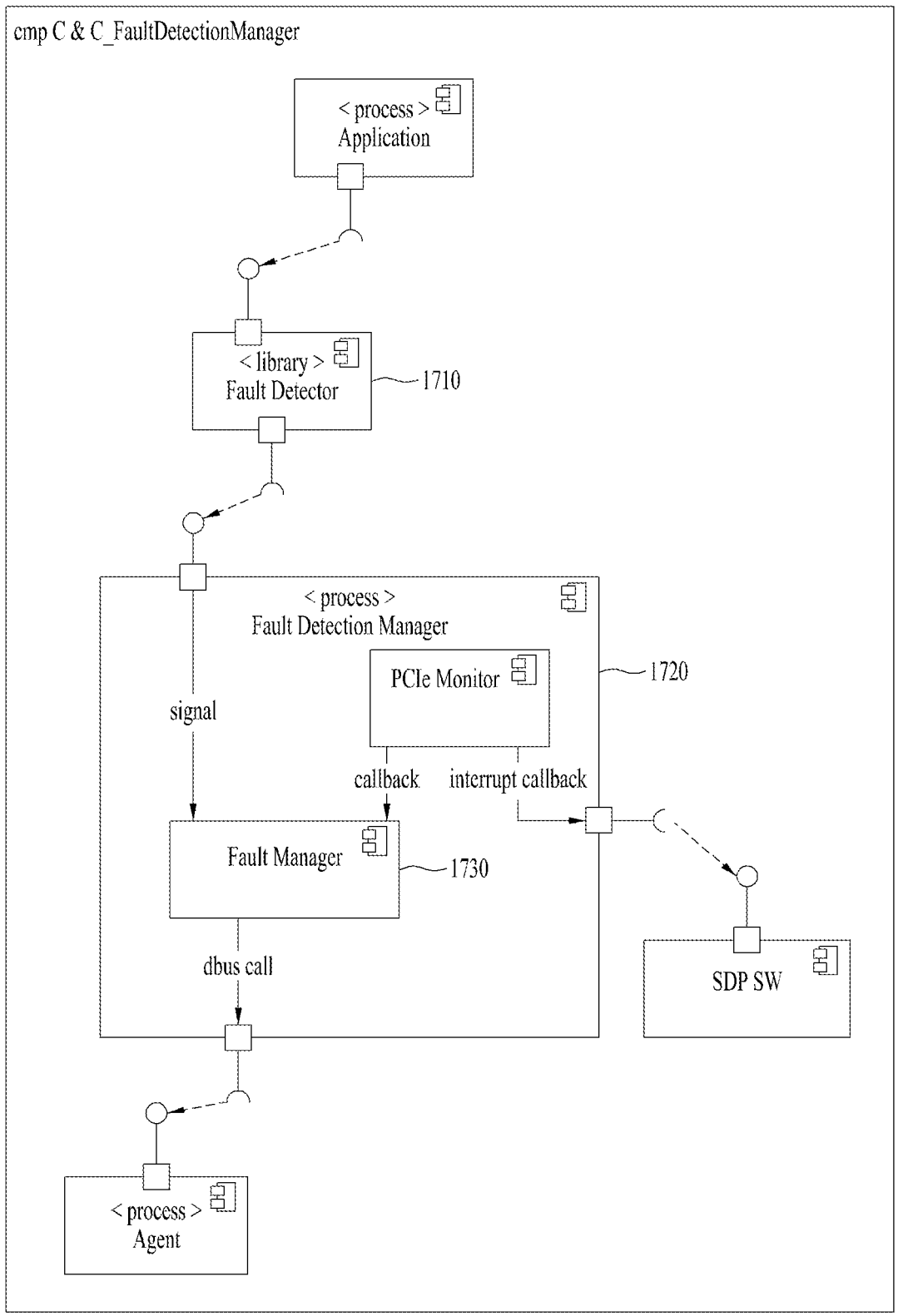
FIG. 17 is a diagram for illustrating an operation of a fault manager in a workload distribution scenario between SoCs according to an aspect of the present disclosure.

FIG. 17 is a diagram for illustrating an operation of a fault manager in a workload distribution scenario between SoCs according to an aspect of the present disclosure.

FIG. 17 is a diagram for illustrating the operation of the fault manager described above in FIG. 11 in more detail. That is, components shown in FIG. 17 may be included in one SoC (e.g., the SoC #1).

When the application is launched, a fault detector 1710 is attached to a fault detection manager 1720 and registers a signal action. Thereafter, when the fault occurs, the fault detector 1710 may transmit the fault to a fault manager 1730.

The fault manager 1730 shown in FIG. 17 may receive not only the application fault, but also the PCIe NT link error and the host failover state, and may report the error such that the agent may handle the error. Furthermore, the fault manager 1730 shown in FIG. 17 may detect the PCIe NT link error and the host failover using an interrupt that provides a PCIe driver.

FIG. 18 is a diagram for illustrating a resource table in a workload distribution scenario between SoCs according to an aspect of the present disclosure.

More specifically, FIG. 18 shows a structure of a resource table for the resource manager described above in FIG. 14 to manage the resources.

Referring to (a) in FIG. 18, (i) Required Resource & Threshold for decision is information necessary for launching the application, and is a field related to information of the resources required for driving the app. (ii) In a Launch type, Base is a type that is launched during the BootUp, and Local is a type that is launched only in its own SoC, and Global means a type that may be launched not only in its own SoC, but also in another SoC. In one example, (iii) Priority is a field related to a priority policy of termination when there is insufficient resource, and (iv) Running is a field indicating a currently running SoC Node.

As described above in FIG. 14, the resource manager may collect the information about itself and the remote (the client). That is, the resource manager may collect the resources of the local and the remote, and manage and store the information of the resource available at moment or during the average time (N seconds). (b) in FIG. 18 is related thereto. The resource manager may manage information including gathering information, the CPU/memory, the DSP, the GPU, the at moment/average time (N seconds) in a table structure shown in (b) in FIG. 18. Further, the information of (b) in FIG. 18 may be used to determine which node to launch the application for the workload distribution.

Figure 19:
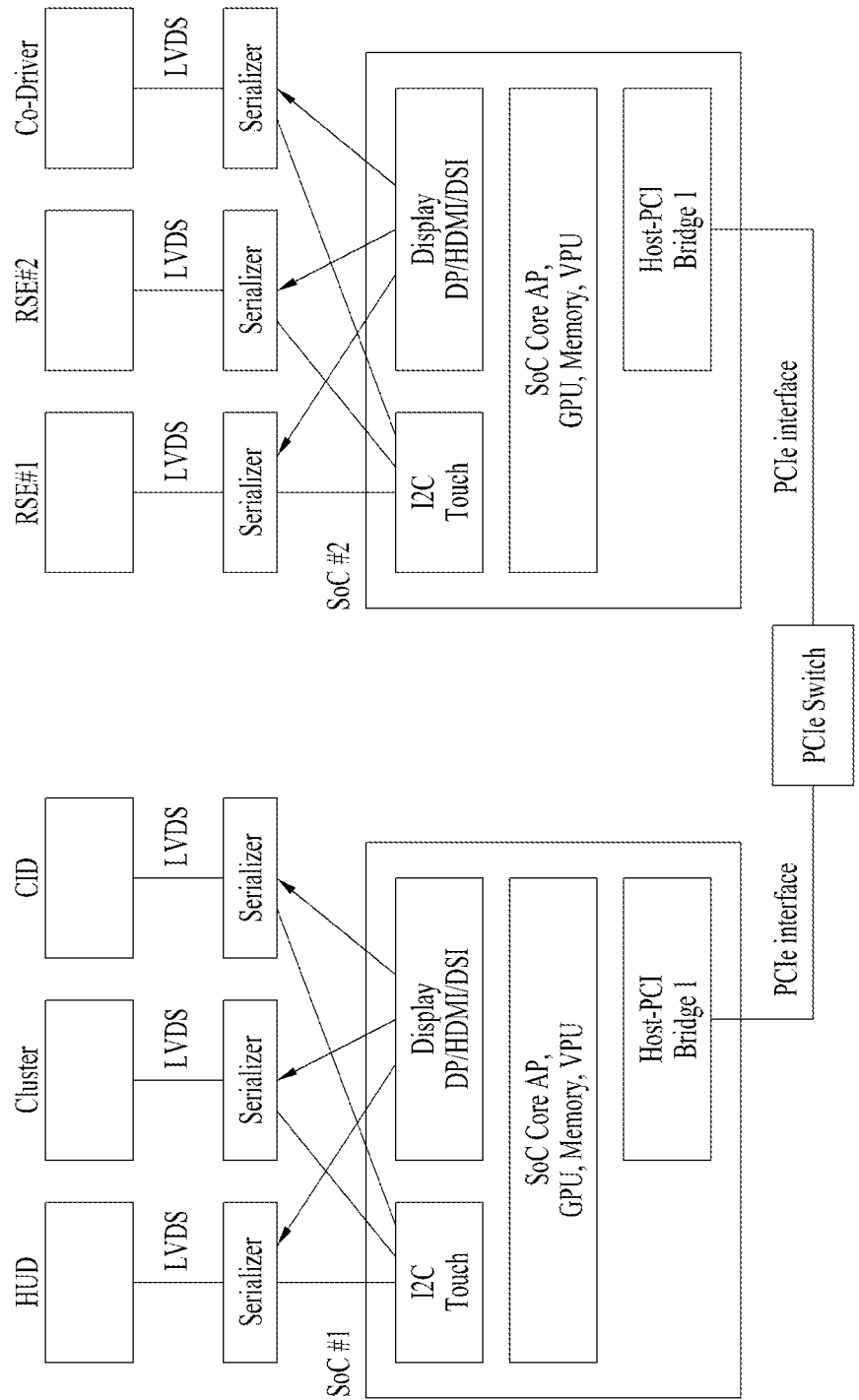
FIG. 19 is a diagram for illustrating a touch interaction in a workload distribution scenario between SoCs according to an aspect of the present disclosure.

FIG. 19 is a diagram for illustrating a touch interaction in a workload distribution scenario between SoCs according to an aspect of the present disclosure. Specifically, an embodiment shown in FIG. 19 may be referred to as a more specific embodiment of steps S1640 to S1660 of FIG. 16.

i) After the system boot up, two SoCs (the SoC #1 and the SoC #2) are connected to each other through the PCIe Switch interconnection.

ii) Each SoC launches a local launch application and displays a launch screen through the HUD/Cluster/CID/RSE. For example, the SoC #1 may output its own local launch application on one of the HUD, the cluster, and the CID. The SoC #2 may output its own local launch application on one of the RSE #1, the RSE #2, and the Co-Driver.

iii) In a state where a resource load of the SoC #1 is high (e.g., the resource full state), when the user requests the launch of the application connected to the SoC #1 through the touch input, the agent of the SoC #1 may receive the touch input and transmit a launch command to the SoC #2.

iv) The SoC #2 may transfer the launch screen to the SoC #1 through the PCIe Switch.

v) The SoC #1 may transmit the touch input of the user related to the application to the SoC #2 through the PCIe interconnection. A screen on which calculation and rendering are completed of the SoC #2 may be transferred from the SoC #2 to the SoC #1 again. Furthermore, the screen on which the calculation and the rendering are completed may be output on the CID. In one example, according to an aspect of the present disclosure, an interface between the display and the SoC may be a low-voltage differential signaling (LVDS), and the LVDS may include display output and touch input signals.

The embodiments of the present disclosure described above may be implemented through various means. For example, the embodiments of the present disclosure may be implemented by hardware, firmware, software, or combinations thereof.

In a case of the implementation by the hardware, the method according to the embodiments of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

In a case of the implementation by the firmware or the software, the method according to the embodiments of the present disclosure may be implemented in a form of a module, a procedure, a function, or the like that performs the functions or the operations described above. A software code may be stored in a memory unit and driven by the processor. The memory unit may be located inside or outside the processor, and may exchange data with the processor through various known means.

A detailed description of the preferred embodiment of the present disclosure disclosed as described above has been provided such that a person skilled in the art may embody and implement the present disclosure. Although the above description is made with reference to the preferred embodiment of the present disclosure, those skilled in the art will appreciate that the present disclosure may be variously modified and changed without departing from the spirit and scope of the present disclosure described in the following claims. Therefore, the present disclosure is not intended to be limited to the embodiments described herein, but is intended to accord the widest scope consistent with the principles and the novel features disclosed herein. In addition, although the preferred embodiment of the present specification has been illustrated and described above, this specification is not limited to the specific embodiments described above. Without departing from the gist of the present specification claimed in the claims, various modifications may be implemented by those of ordinary skill in the technical field to which the present invention pertains. In addition, such modifications should not be understood individually from the technical spirit or prospect of this specification.

In addition, in this specification, both the product invention and the method invention are described, and the description of both inventions may be supplementally applied as necessary.

[Mode]

Various forms for implementing the invention have been described in the Best Mode.

The above description should not be construed as limiting in all respects and should be considered as illustrative. The scope of the present disclosure should be determined by reasonable interpretation of the appended claims, and all changes within the equivalent scope of the present disclosure are included in the scope of the present disclosure.

INDUSTRIAL APPLICABILITY

The present disclosure described above may be implemented as a computer-readable code on a medium in which a program is recorded. Computer-readable media include all types of recording devices that store data that may be read by a computer system. Examples of the computer-readable media include a hard disk drive (HDD), a solid state disk (SSD), a silicon disk drive (SDD), a ROM, a RAM, a CD-ROM, a magnetic tape, a floppy disk, an optical data storage device, and the like. In addition, the computer-readable media may be implemented in a form of a carrier wave (e.g., transmission over the Internet). In addition, the computer may include a controller 180 of a terminal. Therefore, the detailed description above should not be construed as restrictive in all respects and should be considered as illustrative. The scope of the present disclosure should be determined by reasonable interpretation of the appended claims, and all changes within the equivalent scope of the present disclosure are included in the scope of the present disclosure.

The invention claimed is:

1. A device configured to control a display disposed in a vehicle, the device comprising:
a first system on chip (SoC) configured to control display operations,
wherein the first SoC includes:
an agent configured to control launch of an application;
a resource manager configured to measure and manage resources; and
a data sharing manager configured to (i) control a connection between applications of different nodes based on a high-speed interface and (ii) share data,
wherein the agent is configured to:
based on the first SoC being connected to at least one second SoC of a plurality of SoCs by the high-speed interface, set a server or a client between the first SoC and the second SoC,
wherein the first SoC is configured to, based on available resources of the first SoC and the second SoC, determine whether to execute a first application, and
wherein, based on the first application being executed in the second SoC, data sharing is performed between the first SoC and the second SoC.

2. The device of claim 1, wherein the first SoC is configured to, based on a resource state of the first SoC being a resource full state and a resource state of the second SoC not being the resource full state, request the second SoC to launch a specific application, wherein the first SoC and the second SoC are connected to each other through a switch interface, and wherein the first SoC is configured to, based on (i) a predetermined priority and (ii) the resource states of the first SoC and the second SoC both being the resource full state, terminate at least one application.

3. The device of claim 1, wherein the first SoC and the second SoC are individually initialized for the connection between the first SoC and the second SoC, and determine whether to execute the first application on the first SoC or the second SoC based on resources available for each of the first SoC and the second SoC, and wherein data sharing is performed between the first SoC and the second SoC based on the second SoC executing the first application.

4. The device of claim 1, wherein each of the first SoC and the second SoC further includes a fault manager configured to detect a fault of the first application, and wherein at least one application is one of a base application launched during boot-up of a device disposed in the vehicle or a normal application launched by a user request.

5. The device of claim 1, wherein the first SoC is configured to control a plurality of displays, and wherein an additional device is connected to the first SoC for the plurality of displays based on a switch interface for the first SoC.

6. The device of claim 1, wherein at least one SoC is connected to the first SoC, and the at least one SoC connected to the first SoC is replaced or upgraded with an additional SoC.

7. The device of claim 1, wherein, based on a fault being detected in at least one of the first SoC or the second SoC launching the first application, the at least one of the first SoC or the second SoC with the fault is configured to generate report information regarding the fault, wherein the first SoC is configured to generate resource information for managing the resources, wherein the resource information includes type information and priority information regarding the resources, and wherein the resource manager is configured to collect information associated with resources of the first SoC or the second SoC.

8. A method of controlling a display disposed in a vehicle, the method comprising:

controlling, by a first SoC, a connection between application of different nodes based on a high-speed interface and shared data, the first SoC including (i) an agent configured to control launch of an application, (ii) a resource manager configured to measure and manage resources, and (iii) a data sharing manager configured to share data;

connecting the first SoC to at least one second SoC of a plurality of SoCs based on the high-speed interface; and setting, by the agent, a server or a client between the first SoC and the second SoC;

wherein the first SoC is configured to, based on available resources of the first SoC and the second SoC, determine whether to execute a first application, and wherein, based on the first application being executed in the second SoC, data sharing is performed between the first SoC and the second SoC.

9. The method of claim 8, wherein the first SoC is configured to, based on a resource state of the first SoC being a resource full state and a resource state of the second SoC not being the resource full state, request the second SoC to launch a specific application, wherein the first SoC and the second SoC are connected to each other through a switch interface, and wherein the first SoC is configured to, based on (i) a predetermined priority and (ii) the resource states of the first SoC and the second SoC both being the resource full state, terminate at least one application.

10. The method of claim 8, wherein the first SoC and the second SoC are individually initialized for the connection between the first SoC and the second SoC, and determine whether to execute the first application on the first SoC or the second SoC based on resources available for each of the first SoC and the second SoC, and wherein data sharing is performed between the first SoC and the second SoC based on the second SoC executing the first application.

11. The method of claim 8, further comprising:

detecting a fault of an application of the first SoC, wherein at least one application is one of a base application launched during boot-up of a device disposed in the vehicle or a normal application launched by a user request.

12. The method of claim 8, wherein the first SoC is configured to control a plurality of displays, and wherein an additional device is connected to the first SoC for the plurality of displays based on a switch interface for the first SoC.

13. The method of claim 8, wherein at least one SoC is connected to the first SoC, and the at least one SoC connected to the first SoC is replaced or upgraded with an additional SoC.

14. The method of claim 8, wherein, based on a fault being detected in at least one of the first SoC or the second SoC launching the first application, the at least one of the first SoC or the second SoC with the fault is configured to generate report information regarding the fault, wherein the first SoC is configured to generate resource information for managing the resources, wherein the resource information includes type information and priority information regarding the resources, and wherein information associated with resources of the first SoC or the second SoC is collected.

\* \* \* \* \*